(12) United States Patent
Fleischer

(10) Patent No.: US 11,090,665 B2
(45) Date of Patent: Aug. 17, 2021

(54) NOZZLE DEVICE AND SYSTEM FOR SORTING OBJECTS

(71) Applicant: TOMRA SORTING GMBH, Mülheim-Kärlich (DE)

(72) Inventor: Uwe Fleischer, Herzhorn (DE)

(73) Assignee: TOMRA SORTING GMBH, Müllheim-Kärlich (DE)

( * ) Notice: Subject to any disclaimer, the term of this patent is extended or adjusted under 35 U.S.C. 154(b) by 39 days.

(21) Appl. No.: 15/741,905

(22) PCT Filed: Jul. 6, 2016

(86) PCT No.: PCT/EP2016/065936
§ 371 (c)(1),
(2) Date: Jan. 4, 2018

(87) PCT Pub. No.: WO2017/055772
PCT Pub. Date: Jan. 12, 2017

(65) Prior Publication Data
US 2019/0070618 A1    Mar. 7, 2019

(30) Foreign Application Priority Data
Jul. 6, 2015 (EP) ..................... 15175494

(51) Int. Cl.
*B05B 1/20* (2006.01)
*B07C 5/36* (2006.01)
(Continued)

(52) U.S. Cl.
CPC ............. *B05B 1/202* (2013.01); *B05B 1/005* (2013.01); *B05B 1/323* (2013.01); *B05B 15/525* (2018.02);
(Continued)

(58) Field of Classification Search
CPC ..... B05B 1/202; B05B 15/525; B05B 15/528; B05B 15/658; B05B 1/323;
(Continued)

(56) References Cited

U.S. PATENT DOCUMENTS 2,524,764 A * 10/1950 Burke ................. F16K 15/147
                                              137/217
3,199,787 A    8/1965 Oishei et al.
(Continued)

FOREIGN PATENT DOCUMENTS

AT        395 545 B    1/1993
AT        8 634 U1   10/2006
(Continued)

OTHER PUBLICATIONS

International Search Report (PCT/ISA/210) dated Oct. 11, 2016, by the European Patent Office as the International Searching Authority for International Application No. PCT/EP2016/065936.
(Continued)

*Primary Examiner* — Steven M Cernoch
(74) *Attorney, Agent, or Firm* — Buchanan Ingersoll & Rooney P.C.

(57) ABSTRACT

A nozzle device for sorting objects by ejecting a gaseous media towards said object. The nozzle device nozzle device including: a nozzle unit including at least one nozzle; a nozzle bar including gas supply means for providing a gaseous media to said nozzle unit; and a nozzle fixation bracket adapted for holding said nozzle unit in place; said at least one nozzle including: an inlet for receiving the gaseous media; and having one outlet, having an outlet area, for ejecting the gaseous media towards an object to be sorted; a channel extending between said inlet and said outlet; an outlet portion surrounding at least said outlet, wherein said outlet portion including a flexible material, which deflects
(Continued)

upon ejection of the gaseous media, received from said nozzle bar, through said outlet whereby said outlet area increases. Also, a system for sorting objects.

13 Claims, 8 Drawing Sheets

(51) Int. Cl.
| | |
|---|---|
| *B07C 5/342* | (2006.01) |
| *B05B 15/528* | (2018.01) |
| *B05B 1/00* | (2006.01) |
| *B05B 1/32* | (2006.01) |
| *B05B 15/525* | (2018.01) |
| *B05B 15/658* | (2018.01) |
| *G01N 21/85* | (2006.01) |
| *B05B 13/02* | (2006.01) |

(52) U.S. Cl.
CPC .......... *B05B 15/528* (2018.02); *B05B 15/658* (2018.02); *B07C 5/3425* (2013.01); *B07C 5/363* (2013.01); *B05B 13/0221* (2013.01); *G01N 21/85* (2013.01)

(58) Field of Classification Search
CPC ....... B05B 13/0221; B05B 1/005; B05B 1/20; B05B 3/044; B07C 5/363; B07C 5/3425; B07C 5/366; G01N 21/85
See application file for complete search history.

(56) References Cited

U.S. PATENT DOCUMENTS

| | | | | |
|---|---|---|---|---|
| 3,587,972 | A * | 6/1971 | Weeth | A01G 25/023 |
| | | | | 239/229 |
| 4,099,494 | A * | 7/1978 | Goloff | F02M 61/047 |
| | | | | 123/445 |
| 6,371,392 | B1 | 4/2002 | Steinman | |
| 6,986,472 | B2 * | 1/2006 | Gordon | B05C 5/0216 |
| | | | | 222/529 |
| 7,607,590 | B2 * | 10/2009 | Nies | B05B 15/652 |
| | | | | 239/255 |
| 7,658,291 | B2 * | 2/2010 | Valerio | B07C 5/344 |
| | | | | 209/44.2 |
| 9,557,108 | B2 * | 1/2017 | Freers | B05B 1/044 |
| 2009/0001196 | A1 | 1/2009 | Grez | |
| 2010/0108102 | A1 | 5/2010 | Kehl et al. | |
| 2011/0056874 | A1 | 3/2011 | Kojima et al. | |
| 2013/0019950 | A1 * | 1/2013 | VanderPyl | B05B 1/02 |
| | | | | 137/1 |
| 2013/0161359 | A1 | 6/2013 | Alluigi et al. | |
| 2013/0221033 | A1 | 8/2013 | Alluigi | |

FOREIGN PATENT DOCUMENTS

| | | |
|---|---|---|
| CN | 101326014 A | 12/2008 |
| CN | 101522322 | 9/2009 |
| CN | 101952056 A | 1/2011 |
| CN | 203091159 U | 7/2013 |
| CN | 203684300 U | 7/2014 |
| CN | 104138851 A | 11/2014 |
| DE | 20 2008 017748 U1 | 6/2010 |
| DE | 10 2012 002 943 A1 | 8/2013 |
| EP | 0 479 756 A2 | 4/1992 |
| RU | 2549860 C2 | 4/2015 |
| RU | 2553298 C2 | 6/2015 |
| WO | WO 2007/069202 A2 | 6/2007 |

OTHER PUBLICATIONS

Written Opinion (PCT/ISA/237) dated Oct. 11, 2016, by the European Patent Office as the International Searching Authority for International Application No. PCT/EP2016/065936.
Search Report dated Dec. 19, 2018, by the Chinese Patent Office for Chinese Application No. 2016800376943, 2 pages.
Office Action (Inquiry—under the substantive examination) dated Sep. 5, 2019, by the Federal Service for Intellectual Property in Russian Patent Application No. 2018102736/05(003804) and an English Translation of the Office Action. (13 pages).
First Office Action issued in corresponding Chinese Patent Application No. 2020111102190900, dated Nov. 16, 2020; with English Translation (18 pages).

\* cited by examiner

NOZZLE DEVICE AND SYSTEM FOR SORTING OBJECTS

TECHNICAL FIELD OF THE INVENTION

The present inventive concept relates to a nozzle for ejecting a gaseous or liquid medium to sort objects. The present inventive concept further relates to a nozzle device, to a system and to a method for sorting objects.

BACKGROUND OF THE INVENTION

A sorting machine may be used in e.g. mining, recycling, or the scrapping industry to sort objects such as e.g. plastics, metals, stones, gems and diamonds from a material flow. A sorting machine may also be used in the food industry for sorting different kind of food articles such as e.g. potatoes or fresh vegetables. The sorting machine typically comprises a nozzle device with nozzles through which a gaseous or liquid media is ejected towards the objects to be sorted, and some sort of receiving means for receiving the sorted objects.

In order to determined which of the objects that is to be sorted out of the material flow, the sorting machines commonly operate using transmitter and receiver units, such as e.g. optical or inductive transmitter and receiver units. For example, as described in AT 395,545 B, the transmitter units comprise light sources, such as diode light sources, emitting light beams, which are bundled in the receiver unit onto a photocell via a lens system. The transmitter and the receiver units are typically connected to a central computing unit which processes the incoming data and determines the position, size, and type of the individual objects in the material flow based on the light beams received by the receiver units and emitted by the transmitter units.

Subsequently, the sorting of the individual objects is carried out based on the completed identification/determination of the individual objects in the material flow. This sorting operation is performed by ejecting a gaseous or liquid media against the individual objects, based on the identification/determination of the individual objects by the computing unit. The sorting machine, comprising the nozzle and thereto leading flow channel may be controlled by valves, such as solenoid valves, operated by the computing unit.

One type of a sorting machine, for example the sorting machine described in AT 395,545 B, use a nozzle arranged to eject the gaseous media in a direction "bottom up", meaning that the nozzles is arranged to eject the gaseous media in a direction having a component opposite to the force of gravity. The material flow is transported towards the nozzles by e.g. a conveyer belt, where after the objects in the material flow are allowed to fall over the edge of the conveyer belt. During the descent of the falling objects, a nozzle ejects a gaseous media towards the objects to be sorted whereby the falling path of the object is changed, for example by forcing the object into a container or onto a separated conveyer belt.

Sorting machines having nozzles arranged "bottom up" have several advantages compared to nozzles being arranged to eject the gaseous or liquid media in a direction having a component coinciding with the force of gravity. For example, "bottom up" arrangement generally provides a higher sorting accuracy and less consumption of the gaseous or liquid media. However, the nozzles arranged "bottom up" has the disadvantage that dust and particles more easily may be transported into the nozzle and thereby cause clogging of the nozzle and/or the deterioration of components, such as valves, arranged inside, or prior to, the nozzle.

A solution to one of these problems is for example disclosed in DE 20 2008 017 748 U1, where the sorting machine is provided with a particle trap arranged inside the nozzles in order to collect incoming particles and prevent them from entering further into the nozzle. However, such particle trap needs maintenance, e.g. emptying the particle trap, and further complicates the structure of the nozzle. There is thus a need for improving the state of the art and to provide an improved or at least better adapted nozzle and/or sorting machine.

SUMMARY OF THE INVENTION

An object of the present inventive concept is to overcome the above problems, and to provide a solution that to at least some extent, improves the prior art and/or provides a less complex structure compared to the prior art solutions. This, and other objects, which will become apparent in the following, is accomplished by means of a nozzle device and a system for sorting objects using said nozzle device defined in the accompanying claims.

The present inventive concept is based on the insight by that by providing an outlet portion of a nozzle of a flexible material, particles and/or dust or the like which have attached to e.g. the outlet portion of the nozzle, may easily be shaken off the nozzle upon deflection of the flexible outlet portion during ejection of a gaseous media through the outlet of the nozzle. Furthermore, the risk of having particles and/or dust or the like entering into the nozzle is reduced due to the reduced cross section area of the channel provided by the outlet portion, at least when the nozzle is inactive, i.e. when not ejecting a gaseous media through the nozzle outlet. Hence, a nozzle device comprising one or a plurality of nozzles may be operational for longer periods of time without need for system downtime for cleaning or servicing said one or plurality of nozzles.

According to a first aspect of the present invention a nozzle device for sorting objects using a gaseous media is provided. The nozzle device comprising:

a nozzle unit comprising at least one nozzle;

a nozzle bar connectable to a gas supply means for providing a gaseous media to said nozzle unit; and a nozzle fixation bracket adapted for holding said nozzle unit in place;

said at least one nozzle comprising:

an inlet for receiving the gaseous media;

and having one outlet, having an outlet area, for ejecting the gaseous media towards an object to be sorted;

a channel extending between said inlet and said outlet;

an outlet portion surrounding at least said outlet, wherein said outlet portion comprises a flexible material, which deflects upon ejection of the gaseous media, received from said nozzle bar, through said outlet whereby said outlet area increases.

Alternatively or additionally a self cleaning nozzle device for sorting objects using a gaseous or liquid media is provided. The said self cleaning nozzle device comprises:

a nozzle unit comprising at least one self cleaning nozzle;

a nozzle bar connectable to a gas supply means for providing a gaseous media to said nozzle unit; and a nozzle fixation bracket adapted for holding said nozzle unit in place;

said at least one self cleaning nozzle comprising:

an inlet for receiving the gaseous media;

and having one outlet, having an outlet area, for ejecting the gaseous media towards an object to be sorted;

a channel extending between said inlet and said outlet;

an outlet portion surrounding at least said outlet, wherein said outlet portion comprises a flexible material, which deflects upon ejection of the gaseous media, received from said nozzle bar, through said outlet whereby said outlet area increases.

This is advantageous as particles and/or dust or the like that have been attached to e.g. the outlet portion may be shaken off upon the deflection of the outlet portion. Furthermore, during the time of deflection of the outlet portion, being caused by e.g. a pulse or a continuous flow of the ejected gaseous media through the outlet, particles and or dust or the like are less prone to attach to the outlet portion as at least some of these parts of the nozzle is moving upon ejection of the gaseous media. In addition to using gaseous media liquid media such as water under pressure may be used.

The nozzle bar comprises a gas supply means for providing a gaseous media, having a first gas operating pressure, to the nozzle unit. In other words the gas provided by the gas supply means has an operating pressure, the pressure by which objects are sorted and/or the pressure by which the outlet portion deflects. The operating pressure is preferably in the range of 1.5 bars to 10 bars, more preferably in the range of 2 bars to 10 bars.

Each nozzle may be said to only have an inlet and one outlet having a first outlet area when at rest e.g. when no pressurized gaseous media is flowing through the nozzle or in other words a gaseous media having a first gas operating pressure is not provided to the nozzle. When the nozzle is subjected to a gaseous media, such as air, having a first gas operating pressure, the outlet deflects and the outlet area increases to a second outlet area wherein the second outlet area is larger than the first outlet area. Thus particles and/or dust or the like are less prone to enter beyond the outlet portion and further into the channel of the nozzle as they are hindered by the first outlet area of the outlet portion being smaller when the nozzle device is at rest. Hence, the outlet portion may be arranged to minimize or completely close the opening of the nozzle, at least when the nozzle is not ejecting a gaseous media through the outlet of the nozzle.

Additionally each nozzle may be arranged having only one outlet such that each nozzle is arranged for ejecting gaseous media in one main direction. Each nozzle comprises a channel extending between the inlet and the one outlet of each nozzle. The channel fluidly connects the inlet of the nozzle and the outlet of each nozzle.

Furthermore, by providing an outlet portion comprising a flexible material, the pressure level of the gaseous media is allowed to influence the size of the cross section at the outlet portion, (e.g. described as the degree of opening of the nozzle or the cross sectional size of the outlet), upon ejection of the gaseous media through the outlet. Thus, an increase in pressure level of the gaseous media will not only increase the amount of gas ejected from the nozzle by the direct consequence of having a higher pressure, but also by the fact that the outlet portion will deflect towards the outlet to a higher degree due to the higher pressure, and therefore increase the size of the cross section at the outlet, whereby even more gaseous media can be ejected through the outlet.

It should be noted that the outlet portion comprises a flexible material in order to be flexible, i.e. in order to be able to deflect upon ejection of the gaseous media through the outlet. For example, a majority of the outlet portion may be comprised of a flexible material. It should be noted that the flexible material may be described as being an elastic material. Thus, the outlet portion may be described as being elastic.

It should be understood that the more flexible the material of the outlet portion is, the more the outlet portion will deflect upon the ejection of the gaseous media through the outlet. Thus, the less flexible the outlet portion is, the less will the outlet portion deflect upon the ejection of the gaseous media through the outlet. It should be noted that the flexibility of the outlet portion is not only determined based upon the chosen material(s) of the outlet portion but also upon the dimensions and the shape, and upon the width or thickness of the outlet portion. Furthermore, an outlet portion of a smaller width, i.e. a thinner outlet portion, can deflect more compared to an outlet portion of a larger width, i.e. a thicker outlet portion. Thus, the choice of material, the width of the outlet portion as well as the shape of the outlet portion are preferably adapted in such a way that the outlet portion deflects to such a degree that attached particles and/or dust or the like can be shaken off the outlet portion as well as preventing particles from entering into the nozzle channel.

A nozzle fixation bracket is arranged for fixating and holding the nozzle unit in place and in fluid connection to the nozzle bar.

Preferably the shape, the thickness or width of the outlet portion as well as the material of the outlet portion is chosen such that the outlet area of the outlet portion increases by at least 10%, 20%, 40%, 100% and/or not more than 200%, as compared to a first area of the outlet portion when the nozzle is not subjected to gaseous media having a first gas operating pressure e.g. the nozzle and the outlet portion is in an inactive state.

According to at least one exemplary embodiment the outlet portion is dome-shaped and/or tubular-shaped. When the outlet portion is dome-shaped the shape of the outlet portion enables the outlet portion to self close when no gaseous media having a first gas operating pressure is provided to the nozzle. In addition a dome-shaped outlet portion is advantageous by being self-supporting when the nozzle is in a closed state. In addition the dome shape is advantageous in terms of its fluid dynamics by not comprising any sharp structural edges which may cause turbulence in the gaseous media flowing through the nozzle outlet portion. Turbulence may reduce the effectiveness of the ejected gaseous media and result in that a wider or larger air flow frustum is ejected from a nozzle. Each nozzle may have base width being approximately 5.2 mm. Naturally the base width of a nozzle may be chosen depending on the amount and the pressure of the gaseous media supplied to a nozzle as well as the type and size of objects to be sorted. Hence, the nozzle base width may be larger than 6 mm and may also be smaller than 5 mm. The height of a nozzle is approximately 3.7 mm. However, the height may be in the range of 3 mm to 15 mm, or even larger than 15 mm. The height of a nozzle may depend on the thickness of the nozzle fixation bracket. Hence, there is a relation between the thickness of the nozzle fixation bracket and the height of a nozzle.

When the outlet portion deflects the outlet portion may move both in an axial and in the radial direction as compared to the channel of the nozzle. The outlet portion may move so that the outlet portion and the channel wall have a cross sectional area being equal. The outlet portion may also deflect to an extent such that the cross sectional area is larger than the cross sectional area of the channel.

According to at least one exemplary embodiment of the present invention the outlet is defined by at least a first and a second slits intersecting each other, and optionally having a point of intersection coinciding with a centre axis of said channel of said nozzle. Having intersecting slits divides the nozzle outlet into segments each of which deflects when subjected to a flow of gaseous media. By choosing the length of the first and second slits as well as the point of intersection of the slits deflection characteristics of the nozzle outlet portion may be changed. Advantageously the outlet is provided with two slits or more up to 8 slits. For instance the outlet is provided with preferably 2 to 6 slits, more preferably 2 to 4. The slits are advantageously arranged having an even angle between the slits, as seen in the axial direction of the nozzle, such as 90 degrees or a cross shape when the outlet is provided with two slits. If the nozzle outlet is provided with three slits the angle between two adjacent slits is 60 degrees. Generally, a higher number of intersecting slits result in a lower opening pressure and a more even opening of the nozzle. However, at the same time a higher number may result in a higher wear of the material of the nozzle dome.

According to at least one exemplary embodiment of the present invention the outlet portion has a through hole. The through hole may be arranged having a centre point coinciding with a centre axis of the nozzle, or it may be provided offset e.g. not having its centre point coinciding with the centre axis of the nozzle. The through hole may be a circular hole having a diameter being in the range of 1.5 mm. However, the diameter may be configured to be larger, or smaller than 1.5 mm depending on the pressure of the gaseous media provided to the nozzle. If a large pressure of the gaseous media is provided the diameter of the through hole may be smaller than 1.5 mm, for instance between 0.5 mm to 1.5 mm. If the pressure of the gaseous media provided is small the diameter of a through hole may be larger than 1.5 mm, for instance between 1.5 mm and 3 mm, or even larger. Hence, there is a relation between the pressure of the gaseous media, the material and shape of the nozzle as well as the diameter of the through hole of the outlet portion.

According to at least one exemplary embodiment of the present invention the nozzle fixation bracket comprises a number of through holes matching said number of nozzles, each through hole arranged for receiving a nozzle. Such a fixation bracket provides a simple method for fixating a nozzle unit comprising a plurality of nozzles to a nozzle device. Each nozzle may be fixated by an even and distributed force applied to a portion of each nozzle which reduces the risk for gaseous media leaks.

According to at least one exemplary embodiment of the present invention the through holes comprises a chamfered or rounded recess arranged on an outer surface of said nozzle fixation bracket for adapted allowing deflection of said nozzle upon ejection of the gaseous media through said outlet. Thus a nozzle outlet portion is allowed to deflect to a larger extent when a chamfered or rounded recess is provided the through holes. The arrangement also allows for air getting trapped or lodged in the area of the through hole adjacent the nozzle to be pushed off and away from the through hole when the nozzle outlet deflects due to the gaseous media.

According to at least one exemplary embodiment of the present invention the nozzle unit is formed in one piece, which comprises at least two nozzles interconnected by a strip. Having a nozzle unit comprising nozzles interconnected by a strip allows for a cheap manufacturing of a plurality of nozzles. Preferably the strip comprises between 2 and 100 nozzles each nozzle interconnected to adjacent nozzles by said strip. The strip and the nozzles may be manufactured using the same material. Further, it allows for simple mounting and fast replacement of worn nozzles. Different strips of nozzles having different deflection characteristics may be used depending on the type of objects to be sorted. It may also allow for a better fixation of each of the nozzles when clamped down by the nozzle fixation bracket.

According to at least one exemplary embodiment of the present invention the outlet portion comprises a flexible material. This enables for the outlet portion to deflect when the nozzle is in an active state and a gaseous media is ejected from the nozzle. Further it allows for the nozzle outlet portion to return to a inactive and at least partly closed state when no gaseous media is ejected from the nozzle.

According to at least one exemplary embodiment of the present invention the channel wall comprises a flexible material. The nozzle outlet and outlet portion may comprise a flexible material and in addition the whole channel or at least parts of the channel may also comprise a flexible material. For example when the nozzle has a dome-shaped or tubular-shaped design the whole of the nozzle e.g. both the channel and the nozzle outlet and outlet portion may comprise a flexible material. For instance the whole nozzle unit may be made from the same flexible material.

According to at least one exemplary embodiment of the present invention the channel wall comprises a material being different from the material of said outlet portion. The nozzle outlet and outlet portion may comprise a different material as compared to the channel wall. The channel may be made from a less flexible and more structurally rigid material. In such a case the channel may be less prone to deflect or elastically deform when a gaseous media is ejected from the nozzle. This reduces the risk of the channel to deform and/or collapse when debris such as dirt or sand is trapped between the outer walls of the channel and the nozzle fixation bracket.

According to at least one example embodiment, said channel wall and said outlet portion is made in one piece.

According to at least one exemplary embodiment of the present invention the outlet portion is detachable from and/or attachable to said channel wall. This enables for the removal of outlet portions from a respective nozzle thus enabling for servicing individual nozzles in the case of excessive wear or damage to individual nozzles. In such a case there is no need to replace the whole nozzle or a whole nozzle unit when a single nozzle outlet portion is damaged. It further allows for individually configuring each nozzle for different gaseous flow characteristics.

According to at least one exemplary embodiment of the present invention the flexible material comprises at least one of the following: rubber, polyurethane, silicone, or other materials of similar elasticity. Hence, according to such embodiments, the sub-portion comprises at least one of the following: rubber, polyurethane, silicone, or other materials of similar elasticity. Rubber is advantageous to use as it is a relatively cheap material, and provides the desired material properties as discussed above. Polyurethane is advantageous to use as it provides the desired material properties as discussed above.

Moreover, the material(s) of the outlet portion is/are preferably chosen in such a way that the surface of the outlet portion are aerodynamically beneficial, e.g. by having a low surface roughness (i.e. by being smooth) in order not to cause undesired frictional resistance between the gaseous media and the surface of the outlet portion.

According to at least one exemplary embodiment of the present invention a centre to centre distance between two neighbouring nozzles is between 4 mm-8 mm, preferably in the range of 5 mm to 7 mm, more preferably in the range of 5.5 mm to 6.5 mm. The distance between two adjacent nozzles is configured based on the type and size of objects to be sorted. Naturally the smaller the centre to centre distance between two adjacent nozzles, the more nozzles can be fitted to a device for sorting objects. The centre to centre distance is preferably between 4 mm and 8 mm. According to one exemplary embodiment the centre to centre distance is between 5 mm and 7 mm. According to one exemplary embodiment the centre to centre distance is between 5.5 mm and 6.5 mm. According to one exemplary embodiment the centre to centre distance between two adjacent nozzles is 6.25 mm. However, depending on the size of each nozzle the distance may be larger, such as between 8 mm or 20 mm or even larger.

According to at least one exemplary embodiment of the present invention the device further comprises pressure level adjustment means arranged to control the pressure level of the gaseous media. Hereby, the pressure level of the gaseous or liquid media may be increased and/or decreased. This also enables for precise configuring of the amount and pressure of flow of the gaseous media flowing through the nozzles. Such a pressure level adjustment means may be a flow limiting device, a pressure level adjustment valve, a flow constriction or an orifice plate. The pressure level adjustment means may be a global pressure level adjustment means e.g. affecting the pressure level for all nozzles of a nozzle bar, or it may me a local pressure level adjustment means affecting the pressure level for individual nozzles. The pressure level adjustment means may be controllable by an electrical signal or controlled by a computer. Additionally the ejection of the gaseous or liquid media out of the outlet may also be better controlled as an increase in pressure level of the gaseous media will not only increase the amount of gas or liquid ejected from the nozzle by the direct consequence of having a higher pressure, but also by the fact that the outlet portion will deflect more due to the higher pressure, and therefore increase the size of channel cross section at the outlet, whereby even more gaseous media can be ejected through the outlet.

According to at least one exemplary embodiment each nozzle may comprise slits, arranged forming a cross having a point of intersection coinciding with a centre axis of said channel of said nozzle. Thus the slits may divide the nozzle outlet and outlet portion into equally sized segments each of which deflects in the same way when the nozzle is ejecting a gaseous media.

According to at least one exemplary embodiment the nozzle outlet portion may be arranged as a flap or a tab, or even a plurality of tabs. The outlet portion may e.g. protrude radially beyond the channel wall at least partly towards the centreline of said channel with a distance larger than 0.1 mm such as e.g. between 1 mm and 10 mm. The outlet portion may protrude radially beyond the channel wall such that the outlet portion, when the nozzle is in an inactive state, completely blocks and closes the outlet of the nozzle. Alternatively the outlet portion may protrude radially beyond the channel wall only partly such that the nozzle outlet portion, when the nozzle is in an inactive state, comprises an opening. Such an opening may be a through hole, such as a circular through hole or any other geometrical shape. The outlet portion may comprise a plurality of flaps each protruding radially beyond the channel wall at least partly towards the centreline of the channel. For instance if the channel has a circular cross section each flap may be formed as a pie shaped sector. Together, the sectors may form a circular cross section. Additionally each the flaps may be formed as a combination of an annulus divided by radial slits into a plurality of sectors. According to at least one example embodiment, the sub-portion may be described as extending radially into the channel. According to at least one example embodiment, the sub-portion extends radially into the channel with a distance of larger than 0.1 mm such as e.g. between 1 mm and 10 mm or between 1 mm and 5 mm.

Additionally or alternatively each nozzle comprises: an inlet for receiving the gaseous or liquid media;
an outlet for ejecting the gaseous or liquid media towards an object to be sorted;
a channel extending between said inlet and said outlet;
a channel wall surrounding said channel,
an outlet portion surrounding at least said outlet;
wherein said outlet portion comprises a sub-portion protruding radially beyond said channel wall at least partly towards a centreline of said channel, said sub-portion comprising a flexible material in order for said sub-portion to deflect upon ejection of the gaseous or liquid media through said outlet.

The width of the sub-portion, i.e. an extension of the sub-portion in its inactive state, measured in the same direction as the flow of gaseous or liquid media through the nozzle, may e.g. be larger than 0.05 mm such as e.g. between 0.1 mm and 5 mm. According to at least one example embodiment, the width of the sub-portion is larger than 25% of the thickness of the channel wall, such as e.g. between 25% and 100%, of a thickness of the channel wall. According to at least one example embodiment, the width of the sub-portion is smaller than 25% of the thickness of the channel wall.

For example, and according to at least one example embodiment, the nozzle is arranged such that upon deflection of the sub-portion, at least a portion of the sub-portion, such as e.g. an end portion of the sub-portion, deviates at least 20% compared to a position of the sub-portion in its inactive state (i.e. when not gaseous or liquid media is ejected through the outlet). For example, at least a portion of the sub-portion, such as e.g. an end portion of the sub-portion may moves axially and/or radially with a distance of at least 20% of the width of the sub-portion.

It should be understood that the sub-portion need not to, but may, be arranged to surround the outlet of the nozzle. According to at least one example embodiment, the sub-portion is arranged distant from the outlet, such as e.g. over 0.5 mm such as e.g. between 0.5 mm and 2 mm into the channel from the outlet. According to at least one example embodiment, the sub-portion is arranged to surround the outlet and a portion of the channel, such as e.g. a portion of the channel being located closest to the outlet and/or a portion of the channel comprising said outlet.

The sub-portion is according to at least one example embodiment angled outwards towards the outlet of the nozzle. In other words, according to such embodiments the sub-portion is protruding radially beyond said channel wall at least partly towards a centreline of said channel, and at least partly towards the outlet. Thus, the sub-portion may be described as having a main extension extending radially beyond the channel wall at least partly towards a centreline of the channel with an angle of over 90° compared to the channel wall. Thus, the sub-portion may be described as having an extension at least partly in the gaseous or liquid media flow direction. Hereby, the gaseous or liquid media may pass the sub-portion while not causing undesired additional frictional losses between the sub-portion and the gaseous or liquid media.

It should be noted that the channel may have a uniform cross section except for internally of the sub-portion. According to at least one alternative example embodiment, the cross section of the channel varies along the channel. For example, the channel may at least partly be tapering in a direction from the inlet towards the outlet of the channel. According to at least one example embodiment, the channel comprises said inlet and said outlet.

The sub-portion may deflect differently depending on whether a gaseous media or a liquid media is ejected through the nozzle. For example, the same nozzle with the same sub-portion may deflect more if a liquid media is ejected through the nozzle compared to if a gaseous media is used as the liquid media generally has a much higher density compared to a gaseous media. Thus, the sub-portion may e.g. be made of a stronger material composition, i.e. be less flexible when using a liquid media.

The gaseous media may e.g. be compressed air and the liquid media may e.g. be water. The gaseous or liquid media may be ejected through the outlet e.g. in the form of a pulse or e.g. in the form of a flow such as e.g. a continuous flow.

According to at least one example embodiment, said sub-portion is arranged to protrude radially beyond said channel wall in such a way that a cross section of said outlet is smaller compared to a cross section of said channel. In other words, in such embodiments the outlet of said nozzle has a smaller cross section compared to a cross section of the channel upstream of the sub-portion.

Hereby, particles and/or dust or the like are less prone to enter the outlet of the nozzle and further into the channel as the particles and/or dust or they are hindered by the sub-portion at the outlet of the nozzle.

The cross section of the channel upstream of the sub-portion may for example be measured at the channel directly prior to, or directly upstream of, the location of the sub-portion.

According to at least one example embodiment, the sub-portion may extend radially into the channel and thereby reduce the cross section of the channel to be less than 95% of a channel cross section at the inlet. Hence, according to at least one example embodiment, the cross section of said outlet is less than 95% of the cross section of said inlet. According to at least one example embodiment, the sub-portion may extend radially into the channel and thereby reduce the cross section of the channel to be less than 5% of a channel cross section at the inlet. Hence, according to at least one example embodiment, the cross section of said outlet is less than 5% of the cross section of said inlet.

According to at least one example embodiment, said sub-portion is extending circumferentially around at least a part of said channel and/or said outlet.

By extending circumferentially around only a part of said channel and/or said outlet, the sub-portion may more easily deflect compared to if the sub-portion extends circumferentially around the whole of said channel and/or said outlet. However, according to at least one example embodiment, said sub-portion extends circumferentially around the whole of said channel and/or said outlet. Hereby, the sub-portion may hinder particles and/or dust or the like to enter further into the channel around the whole circumference of the channel and/or the outlet.

According to at least one example embodiment, said outlet portion comprises an outlet surface being parallel to said outlet, and a circumferentially arranged indentation extending from said outlet surface and at least partly towards said inlet.

This is advantageous, as the indentation provides a space into which the sub-portion, or at least an end portion of said sub-portion, may move into upon deflection of the sub-portion.

The indentation may e.g. be curved and comprise a bottom arranged to face inwardly towards the inlet of the nozzle. The indentation may extend circumferentially around the whole, or only parts, of said outlet surface. The outlet surface is preferably arranged to face away from the outlet of the nozzle, i.e. to face in the same direction as the outlet of the nozzle.

According to at least one example embodiment, said indentation comprises an inner surface, wherein at least a portion of said inner surface at least partly defines said sub-portion of said outlet portion.

Hereby, the width of at least a part of the sub-portion is reduced, thereby facilitating deflection of the sub-portion. Furthermore, the sub-portion, or at least an end portion of said sub-portion, may move into the indentation upon deflection of the sub-portion.

According to at least one example embodiment, the channel has a cross sectional area in the range of 0.15 mm$^2$-350 mm$^2$.

According to at least one example embodiment, the channel has a cross sectional area in the range of 0.15 mm$^2$-1300 mm$^2$.

The cross section of the channel may e.g. be circular, i.e. in embodiments where the nozzle is arranged as a pipe or a tube, or the cross section of the channel may e.g. be rectangular, e.g. in embodiments where the nozzle is arranged as a slit. If the cross section is circular, the diameter of the channel is preferably in the range of 0.5 mm to 20 mm.

According to at least one example embodiment, the length of the nozzle is in the range of 2 mm to 100 mm.

According to at least one example embodiment, said outlet portion comprises a base portion from which said sub-portion protrudes, and wherein said base portion comprises a flexible material.

Hereby, the base portion and the sub-portion may e.g. be made out of the same material. For example, the whole outlet portion may be made out of the same material. Thus, according to at least one example embodiment, the outlet portion is flexible and comprises a flexible material. According to at least one example embodiment, said outlet portion and said sub-portion is made in one piece.

According to such embodiments, the base portion may, at least to some extent and depending on the circumstances such as e.g. the pressure level of the gaseous or liquid media, deflect, or at least vibrate, together with the sub-portion upon ejection of the gaseous or liquid media through the outlet. Hereby, particles and/or dust or the like attached to the outlet portion, e.g. to an outer surface of the outlet portion may be shaken off upon ejection of the gaseous or liquid media through the outlet.

It should be noted that the base portion of said outlet portion may be an elongation of the channel wall. Thus, the base portion of said outlet portion may be a portion of the channel wall.

According to at least one example embodiment, the flexible material of said outlet portion comprises at least one of the following: rubber, polyurethane, silicone, or other materials of similar elasticity.

According to embodiments where the channel wall is made of a flexible material, the channel wall may, at least to some extent and depending on the circumstances such as e.g. the pressure level of the gaseous media, deflect, or at least vibrate, together with the outlet portion, upon ejection of the gaseous media through the outlet. Hereby, particles and/or dust or the like attached to the channel wall, e.g. to an outer surface of the channel wall may be shaken off upon ejection of the gaseous media through the outlet.

According to at least one example embodiment, the flexible material of said channel wall comprises at least one of the following: rubber, polyurethane, silicone, or other materials of similar elasticity.

According to at least one example embodiment, said channel wall comprises a material being different from the material of said outlet portion. Thus, the channel wall and the outlet portion can be made independently of each other in order to adapt the material properties of the channel wall and the outlet portion to their respective function. According to at least one example embodiment, both the channel wall and the outlet portion are flexible but have different flexibility or elasticity. According to at least one example embodiment, the whole channel wall is made of different materials compared to the outlet portion. For example, the channel wall may be made of a metallic material, such as e.g. stainless steel, while the outlet portion, may comprise a flexible material.

According to at least one example embodiment, said outlet portion is detachable from and/or attachable to said channel wall.

Hereby, the outlet portion may be arranged as an adaptor which can be removed from a first nozzle, such as e.g. be removed from the channel wall of a first nozzle, and then be attached to a second nozzle, such as e.g. attached to the channel wall of a second nozzle. Thus, the outlet portion may be removed for maintenance and subsequently be attached again to a nozzle. The outlet portion may also be removed when it is worn-out and thereafter be replaced with a new outlet portion.

According to at least a second aspect of the present inventive concept, a nozzle device for sorting objects is provided. The nozzle device comprises:

a nozzle bar comprising gas or liquid supply means and a nozzle holder for holding a plurality of nozzles, each nozzle in the plurality of nozzles being configured in accordance with the first aspect of the present inventive concept, and each nozzle in the plurality of nozzles being arranged to receive a gaseous or liquid media from said gas or liquid supply means and being arranged to direct the gaseous or liquid media towards the object to be sorted.

Hereby, several nozzles of the type described with the first aspect of the present inventive concept may be arranged as a plurality of nozzles to sort objects in a material flow.

Effects and features related to each nozzle in the plurality of nozzles of this second aspect of the present inventive concept are largely analogous to those described above in connection with the first aspect of the inventive concept. Embodiments mentioned in relation to the first aspect of the present inventive concept are largely compatible with the second aspect of the inventive concept.

Each nozzle may be connected to the gas supply means by a separate channel. According to at least one example embodiment, the gas supply means comprises a plurality of conduits, each conduit leading to a separate nozzle.

For embodiments comprising a liquid supply means and which are arranged to eject a liquid media through the outlet of each nozzle, the nozzle device may be designed somewhat different to embodiments comprising a gas supply means and which are arranged to eject a gaseous media through the outlet of each nozzle. For example, the dimensions of the nozzles may be different and/or the size of the outlet portion may be different as the liquid media generally has a much higher density compared to a gaseous media. For example, the outlet portion may e.g. be made of a stronger material composition, i.e. be less flexible when using a liquid media.

It should be noted that each nozzle, or at least some of the nozzles, may be detachable from and/or attachable to the nozzle holder. Thus, the nozzles may be changed and replaced.

According to at least one example embodiment, a pitch between two neighbouring nozzles in the plurality of nozzles is between 1 mm-100 mm. In other words, the distance between the centrelines of the channels of two neighbouring nozzles in the plurality of nozzles is between 1 mm-100 mm.

According to at least one example embodiment, the pressure level adjustment means may be arranged distant from the nozzle bar, for example by being connected to a computing unit of a sorting machine comprising said nozzle device.

According to at least one example embodiment, each nozzle, or at least some of the nozzles, in the plurality of nozzles is/are arranged "bottom up", meaning that the nozzle is arranged to eject the gaseous or liquid media in a direction having a component opposite to the force of gravity.

According to at least a third aspect of the present inventive concept, a system for sorting objects using a gaseous media is provided. The system for sorting objects comprising:

transportation means for transporting a material flow with objects to be sorted, receiving means for receiving the sorted objects, a nozzle device according to the first aspect of the present inventive concept.

Effects and features related to the nozzle device of this third aspect of the present inventive concept are largely analogous to those described above in connection with the second aspect of the inventive concept. Embodiments mentioned in relation to the first and second aspect of the present inventive concept are largely compatible with the nozzle and the nozzle device of the third aspect of the inventive concept.

The system may also comprise a computing unit and receiver and transmitting units in order to determine which objects that is to be sorted out of the material flow. The receiver and transmitting units may e.g. be optical or inductive transmitter and receiver units. For example, the transmitter unit may comprise an electromagnetic radiation source, such as e.g. a diode light source emitting light beams, which are bundled in the receiver unit onto a photocell via a lens system. The receiving and transmitting units may as an alternative be based on variations in which color of the objects to be sorted. Here, a camera may be used as the receiver unit and a fluorescent light source, such as e.g. fluorescent tubes may function as the transmitting unit. The receiving and transmitting units may as an alternative be based on transmitted X-rays and complementing sensor array.

According to at least one example embodiment, the transmitter (or transmitting unit) comprises an electro-magnetic radiation source such as e.g. a visible light source. Alternatively the transmitter comprises an X-ray source or a radio frequency-source. According to at least one example embodiment, the receiver unit (or receiving device) comprises a camera for detecting visible light, an X-ray camera or another receiving means for receiving electromagnetic radiation.

The transmitter and the receiver units are typically connected to the computing unit which processes the incoming data and determines e.g. the position, size, and type of the individual objects in the material flow based on the light beams received by the receiver units and emitted by the transmitter units. Subsequently, the sorting of the individual objects may be carried out based on the completed determination/identification of the individual objects in the material flow. This sorting operation may be performed by that the nozzles in the nozzle device eject a gaseous or liquid media against the individual objects, based on the determination/identification of the individual objects by the computing unit. The system, comprising the nozzle device and thereto leading channels may be controlled by valves, such as solenoid valves, operated by the computing unit.

According to at least one example embodiment, the transportation means comprises a conveyer belt for transporting the material flow with objects to be sorted. According to at least one example embodiment, the transportation means comprises a chute arranged for transporting the material flow with objects to be sorted. According to at least one example embodiment, the receiving means comprises a conveyer belt for further transportation of the received and/or sorted objects. According to at least one example embodiment, the receiving means comprises at least one container or bin for receiving the received and/or sorted objects. According to at least one example embodiment, the receiving means comprises at least one chute for further transportation of the objects.

According to at least one example embodiment, the system is a sorting machine. According to at least one example embodiment, the nozzle device is a sorting machine.

According to at least one example embodiment, the system comprises an array of adjacent nozzles. In a preferred embodiment, each nozzle is spaced at a pitch of about 25 mm. As stated above, the sorting system may also comprise means for conveying the product to be sorted; means for scanning the product; means for determining an acceptation or rejection means selection; means for transmitting the accepted or rejection means selection to the receiving means.

Hence, objects to be sorted may be conveyed on e.g. a conveyor belt or e.g. provided by a chute. In the sorting process, the products may be scanned while on the conveyor belt or the chute or while in flight off the end of the belt or after the chute. An accept or reject decision of the objects may then be made based on the outcome of the transmitter and receiving device (e.g. base on optical scanning) and if appropriate the product may be sorted out or ignored or rejected.

In one embodiment, the acceptation or rejection means selection may be based on the size of the object to be sorted. The acceptation or rejection means selection may also be based on an optical analysis of the object to be sorted or on both optical analysis and size of the object to be sorted.

It will be appreciated that the acceptation or rejection means selection, may be determined by using software to choose the acceptation or rejection means selection based on an acceptation or rejection means selection criteria. These criteria may be based on the size or type of properties of the object to be sorted, however, it will be appreciated that they may also be based on other properties of the objects.

The sorting system may also comprise means for determining if the size of the scanned object is below an air acceptation or rejection threshold and means for activating at least one nozzle if the size of the scanned object is below the air acceptation or rejection threshold.

The sorting system may further comprise means for determining if the size of the scanned object is above an air acceptation or rejection threshold and means for activating at least one nozzle if the size of the scanned object is above the air acceptation or rejection threshold.

According to at least a fourth aspect of the present inventive concept, a method for sorting objects using a gaseous or liquid media ejected through a nozzle in accordance with the first aspect of the present inventive concept, or through a nozzle in a nozzle device in accordance with the second and/or third aspects of the present inventive concept, is provided. The method comprises the steps of:

receiving the gaseous or liquid media to said inlet of said nozzle;

transporting the gaseous or liquid media, via said channel to said outlet of said nozzle;

ejecting the gaseous or liquid media through said outlet towards the object to be sorted;

whereby upon ejection of the gaseous or liquid media through said outlet, said sub-portion of said outlet portion deflects in order to remove dust and/or particles attached to said nozzle.

Effects and features related to the nozzle in this fourth aspect of the present inventive concept are largely analogous to those described above in connection with the first aspect of the inventive concept. Embodiments mentioned in relation to the first aspect of the present inventive concept are largely compatible with the fourth aspect of the inventive concept.

The method may further comprise the steps of:

identifying an object to be sorted by a computing unit, a transmitting unit and a receiving unit;

based on said identification, activating a nozzle to receive gaseous or liquid media.

It should be understood that the nozzle, the nozzle device and/or the arrangement described herein may be used as a sorting machine, or at least as a part of a sorting machine, for sorting objects.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

BRIEF DESCRIPTION OF THE DRAWINGS

The present inventive concept will now be described in more detail, with reference to the appended drawings showing example embodiments, wherein.

DETAILED DESCRIPTION OF THE DRAWINGS

In the following description, the present inventive concept is described with reference to a nozzle, a nozzle device comprising such nozzle and a system comprising such nozzle device. The present inventive concept is also described with reference to a method for ejecting a gaseous or liquid media thorough a nozzle in order to sort objects in a material flow. It should be noted that this by no means limits the scope of the inventive concept, which is also applicable in other circumstances for instance with other types or variants of devices than the embodiments shown in the appended drawings. Further, that specific components are mentioned in relation to an embodiment of the inventive concept does not mean that those components cannot be used to an advantage together with other embodiments of the inventive concept.

Figure 1A:
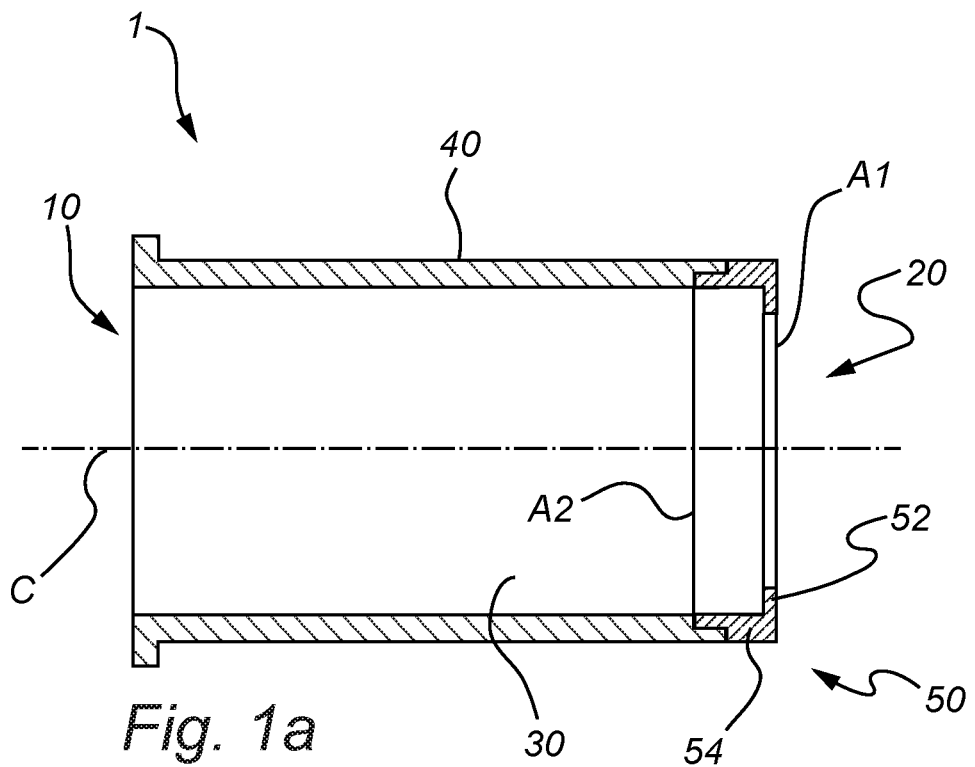
FIG. 1a illustrates in cross section a nozzle according to at least one example embodiment of the inventive concept.

FIG. 1a illustrates in cross section a nozzle 1 for ejecting a gaseous or liquid media to sort objects in accordance with one embodiment of the present inventive concept. The nozzle 1 comprises an inlet 10 for receiving a gaseous or liquid media and an outlet 20 for ejecting the gaseous or liquid media towards an object to be sorted (shown in FIG. 4). A channel 30, being surrounded by a channel wall 40, extends between the inlet 10 and the outlet 20. Furthermore, the nozzle 1 in FIG. 1 comprises an outlet portion 50 surrounding at least the outlet 20, the outlet portion comprises a sub-portion 52 protruding radially beyond the channel wall 40 towards a centreline C of the channel 30. The centreline C extends in the longitudinal direction of the nozzle 1 in the centre of the channel 30.

As illustrated in FIG. 1a, the outlet portion 50 may comprise a base portion 54 from which the sub-portion 52 protrudes towards the centreline C. The base portion 54 may be seen as an elongation of the channel wall 40, and/or may be seen as being comprised in the channel wall 40.

The sub-portion 52 in FIG. 1a may extend circumferentially around at least a part of the channel 30 and/or the outlet 20. Alternatively, the sub-portion 52 may extend circumferentially around the whole channel 30 and/or outlet 20. The width of the sub-portion 52, i.e. the extension of the sub-portion 52 in a direction parallel to the centreline C, may e.g. be larger than 0.05 mm such as e.g. between 0.1 mm and 5 mm.

The sub-portion 52 in FIG. 1a may protrude radially beyond the channel wall 40 with a distance larger than 1 mm such as e.g. with a distance of between 1 mm and 5 mm as compared to the channel wall 40 or the base portion 54 of the outlet portion 50.

The nozzle 1 in FIG. 1a may be arranged e.g. as a pipe or as a slit, i.e. the channel 30 may have a circular cross section or a rectangular cross section, respectively.

The outlet portion of FIG. 1a is indicated as a separate portion in order to visualise that the outlet portion 50 in FIG. 1a may be detached from the nozzle 1, such as e.g. from the channel wall 40 of the nozzle 1, and then e.g. attached to the nozzle 1 again, e.g. after being cleaned.

Figure 1B:
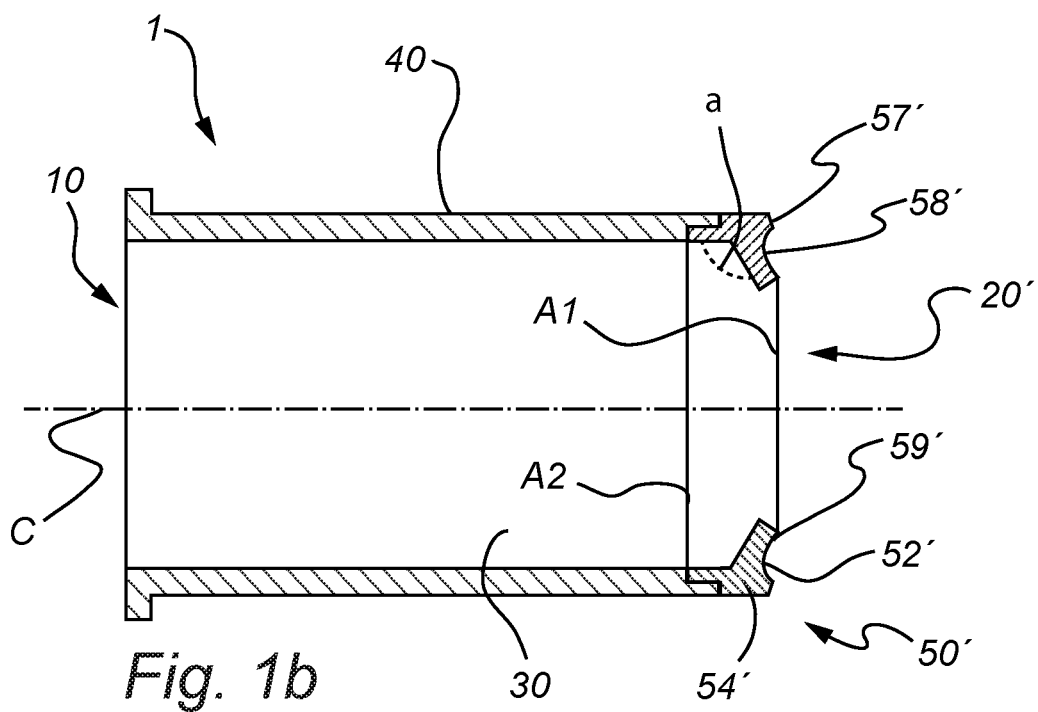
FIG. 1b illustrates in cross section a nozzle according to at least one example embodiment of the inventive concept.

FIG. 1b illustrates in cross section a nozzle 1' for ejecting a gaseous or liquid media to sort objects in accordance with one embodiment of the present inventive concept. The nozzle 1' in FIG. 1b is similar to the nozzle 1 of FIG. 1a why the same reference numerals are used for corresponding features. Furthermore, as the structures and functions of the nozzle 1 in FIG. 1a and the nozzle 1' in FIG. 1b are similar, the differences between the two nozzles 1, 1' will mainly be described below.

In FIG. 1b, the outlet portion 50' comprises a sub-portion 52' and a base portion 54', and is designed differently compare to the outlet portion 50, sub-portion 52 and base portion 54 in FIG. 1a. In FIG. 1b, the sub-portion 52' is protruding radially beyond the channel wall 40 at least partly towards the centreline C of the channel 30, and at least partly towards the outlet 20. Hereby, the sub-portion is arranged with an angle α to the channel wall 40 and/or the base portion 54' of the outlet portion 50, the angle α being larger than 90° in order not to cause undesirable hindrance of the gaseous or liquid media. Thus, the sub-portion 52' has an extension at least partly towards the outlet 20 of the nozzle 1'.

Furthermore, in FIG. 1b, the outlet portion 50' comprises an outlet surface 57' being arranged in the same plane as said outlet 20, i.e. the outlet surface 57' is facing in the same direction as the outlet 20. The outlet portion 50' in FIG. 1b further comprises a circumferentially arranged indentation 58' extending from the outlet surface 57' at least partly towards the inlet 10. The indentation 58' in FIG. 1b comprises an inner surface 59' which at least partly defines the sub-portion 52'. Furthermore, the indentation 58' provides a space in where the sub-portion 52', or at least an end portion of the sub-portion 52' may move into upon deflection of the sub-portion 52' (see below for a more detailed description of how the sub-portion 52' deflects upon ejection of the gaseous or liquid media through the outlet 20).

Similar to the sub-portion 52 in FIG. 1a, the sub-portion 52' in FIG. 1b may extend circumferentially around at least a part of the channel 30 and/or the outlet 20. Alternatively, the sub-portion 52' may extend circumferentially around the whole channel 30 and/or outlet 20. The width of the sub-portion 52', i.e. the extension of the sub-portion 52' in a direction parallel to the centreline C, may e.g. be larger than 0.05 mm such as e.g. between 0.1 mm and 5 mm.

The sub-portion 52' in FIG. 1b may protrude radially beyond the channel wall 40 with a distance larger than 1 mm such as e.g. with a distance of between 1 mm and 5 mm as compared to the channel wall 40 or the base portion 54' of the outlet portion 50.

The nozzle in FIG. 1b may be arranged e.g. as a pipe or as a slit, i.e. the channel 30 may have a circular cross section or a rectangular cross section, respectively.

Figure 1C:
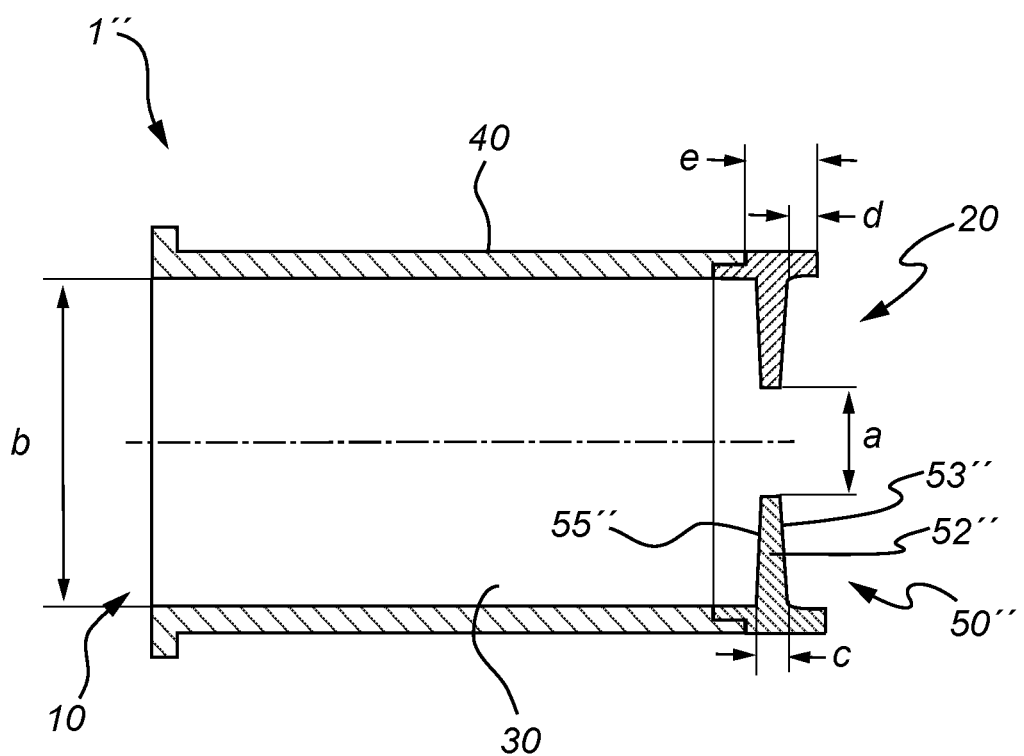
FIG. 1c illustrates in cross section a nozzle according to at least one example embedment of the inventive concept.

FIG. 1c illustrates in cross section a nozzle 1''' for ejecting a gaseous or liquid media to sort objects in accordance with one embodiment of the present inventive concept. The nozzle 1'' in FIG. 1c is similar to the nozzle 1 of FIG. 1a and nozzle 1' in FIG. 1b why the same reference numerals are used for corresponding features.

In FIG. 1c, the different portions and features of the nozzle 1' are illustrated together with size intervals denoted a, b, c, d and e in order to visualise that the size of the different portions and features may vary for different designs of the nozzle 1, 1', 1". Each of the intervals a, b, c, d and e and the corresponding numerical ranges are hereafter described in detail.

Interval a is representing the opening of the nozzle 1", i.e. the size of the outlet 20 or the cross-sectional size of the channel 30 interior of the sub-portion 52". According to at least one example embodiment, interval a is between 0 mm-10 mm.

Interval b is representing the channel 30 cross section within the nozzle 1", i.e. prior to the location of the sub-portion 52". According to at least one example embodiment, interval b is between 0.5 mm and 20 mm.

Interval c is representing the width of the sub-portion 52", i.e. the extension of the sub-portion 52" in the direction of the flow of gaseous or liquid media flowing through the nozzle 1" (in the inactive state of the nozzle 1"). According to at least one example embodiment, the interval c is between 0.1 mm and 5 mm.

Interval d is representing the distance of which the sub-portion 52" may be arranged inside the nozzle 1", i.e. the distance from the outlet 20 of the nozzle 1" to an outlet facing surface 53" of the sub-portion 52". According to at least one example embodiment, the interval d is chosen to be between 0 mm and 5 mm.

Interval e is representing the length of the outlet-portion 50", i.e. the extension of the outlet-portion 50" in the same direction as the channel wall 40. According to at least one example embodiment, the interval e is between 0.5 mm and 50 mm. If the outlet portion 50" is a separate part 50" compared to the channel wall 40, the length of this separate part 50" may thus be between 0.5 mm and 50 mm.

According to at least one example embodiment, the sub-portion 52" comprises an inlet facing surface 55" arranged to face the inlet 10 when the nozzle 1" is in its inactive state (i.e. when no gaseous or liquid media is flowing through the outlet 20), and an outlet facing surface 53" arranged to face the outlet 20 in the inactive state, or be substantially parallel to the outlet 20 in the inactive state. According to such embodiments, the width of the sub-portion 52" which is represented by interval c is in FIG. 1*c*, is the extension from the inlet facing surface 55" to the outlet facing surface 53", e.g. the smallest distance from the inlet facing surface 55" to the outlet facing surface 53"

In FIGS. 1*a*-1*c*, the sub-portion 52, 52', 52" is arranged to protrude radially beyond the channel wall 40 in such a way that a cross section A1 of the outlet is smaller compared to a cross section of the channel A2. As illustrated in FIGS. 1*a* and 1*b*, the ratio of A1/A2 is approximately 85% and 75% respectively. However, as illustrated in FIG. 1*c* the sub-portion 52" may be arranged further into the channel 30, and thus not directly at the outlet 20 of the nozzle 1" Here, the channel cross section interior of the sub-portion 52" is approximately 35% of a cross section of the channel measured e.g. in the middle or at the inlet of the channel 30.

It should also be noted that the cross-sectional view of the nozzles 1, 1', 1" in FIGS. 1*a*-1*c* are symmetrical along the centreline C, why the reference numeral related to a certain feature in FIGS. 1*a*-1*c* is only indicated on one side of the centreline C. The nozzles 1, 1', 1" in FIGS. 1*a*-1*c* may each be fully symmetrical along the centreline C for example if each of the nozzles 1, 1', 1" is shaped e.g. as a pipe. Each of the nozzles 1, 1', 1" may however be shaped differently, e.g. as a slit (i.e. having a rectangular shaped cross section).

The function of the nozzle 1, 1', 1" will now be described further with reference to FIGS. 2*a*-2*f*, disclosing the nozzle 1' of FIG. 1*b*, why same reference numerals are used to describe the nozzle 1' in FIGS. 2*a*-2*f*.

Figure 2A:
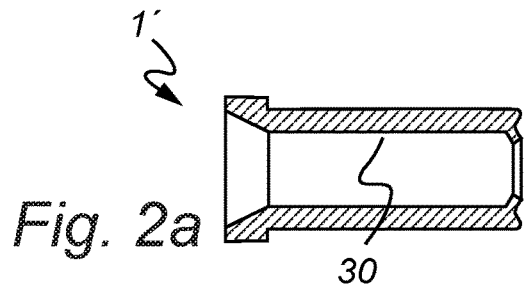
FIGS. 2a-2e illustrate different steps of when a gaseous or liquid media is ejected through a nozzle according to at least one example embodiment of the inventive concept.

FIG. 2*a* illustrates a nozzle 1' similar to the nozzle 1' of FIG. 1*b*. The nozzle 1' in FIG. 2*a* is inactive, i.e. there is no gaseous or liquid media flowing through the channel 30 of nozzle 1'.

Figure 2B:
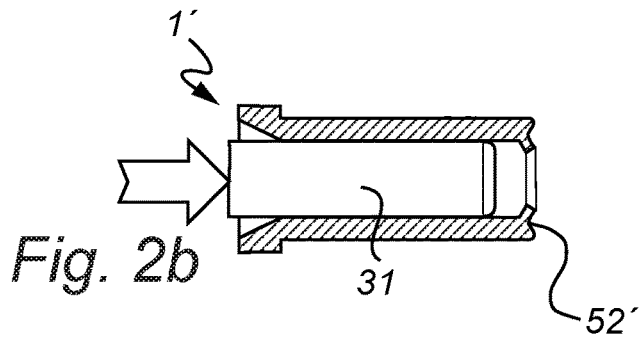

In FIG. 2*b*, gaseous or liquid media 31 has entered through the inlet 10 and has penetrated into the channel 30, e.g. as a consequence of a valve (not shown) opening upstream of the inlet 10 and letting in gaseous or liquid media 31 to the nozzle 1'.

Figure 2C:
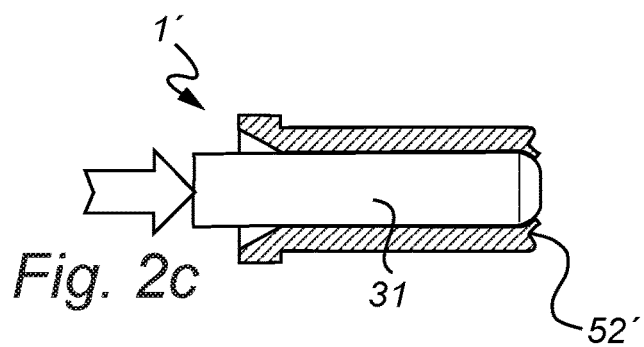

In FIG. 2*c* the gaseous or liquid media 31 has begun to be ejected through the outlet 20. As can be seen in FIG. 2*c*, the sub-portion 52' is flexible and has started to deflect upon the ejection of the gaseous or liquid media 31 through the outlet 20. Hereby, as described previously, particles and/or dust or the like that have been attached to e.g. the sub-portion 52' and/or other parts of the outlet portion 50' may be shaken off upon the deflection of the sub-portion 52'.

Figure 2D:
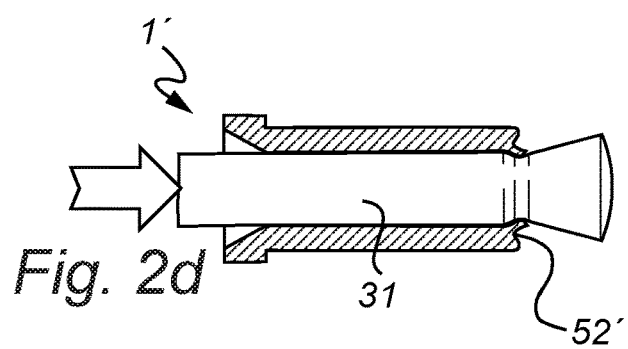
Figure 2E:
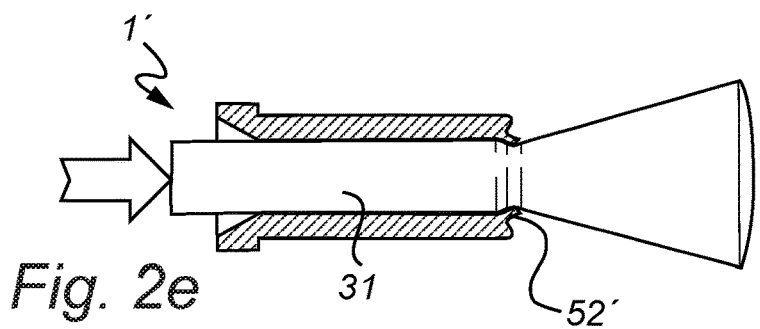

FIG. 2*d*-2*e* show different degrees of deflection of the sub-portion as the gaseous or liquid media 31 has been further ejected through the outlet (FIG. 2*d*) and where a full ejection media cone has been established (FIG. 2*e*). Depending on the flexibility of the sub-portion 52', the degree of deflection will vary as a result of the pressure level of the flow of gaseous or liquid media 31.

In FIG. 2*f*, the nozzle 1' is again inactive and no gaseous or liquid media is flowing thorough the nozzle 1', e.g. as a consequence of that the valve arranged upstream has closed.

In other words, the function of the nozzle 1, 1' may be described by the following steps:

receiving the gaseous or liquid media 31 to the inlet 10 of the nozzle 1, 1' (shown in FIG. 2*b*);

transporting the gaseous or liquid media 31, via the channel 30 to the outlet 20 of the nozzle 1, 1' (shown in FIGS. 2*b* and 2*c*);

ejecting the gaseous or liquid media 31 through the outlet 20 towards an object to be sorted (shown in FIGS. 2*d* and 2*e*);

whereby upon ejection of the gaseous or liquid media 31 through the outlet 20, the sub-portion 52, 52' of the outlet portion 50, 50' deflects in order to remove dust and/or particles attached to the nozzle 1, 1'.

It should be noted that the whole outlet portion 50, 50' may be flexible. Furthermore, the channel wall 40 may be flexible. Any one of the outlet portion 50, 50', the sub-portion 52, 52', and the channel wall 40 may be made flexible by comprising a flexible material such as e.g. rubber, polyurethane, silicone, or other materials of similar elasticity. According to at least one example embodiment, a majority of at least one the outlet portion 50, 50', the sub-portion 52, 52', and the channel wall 40 comprises a flexible material such as e.g. rubber, polyurethane, silicone, or other materials of similar elasticity.

Figure 3:
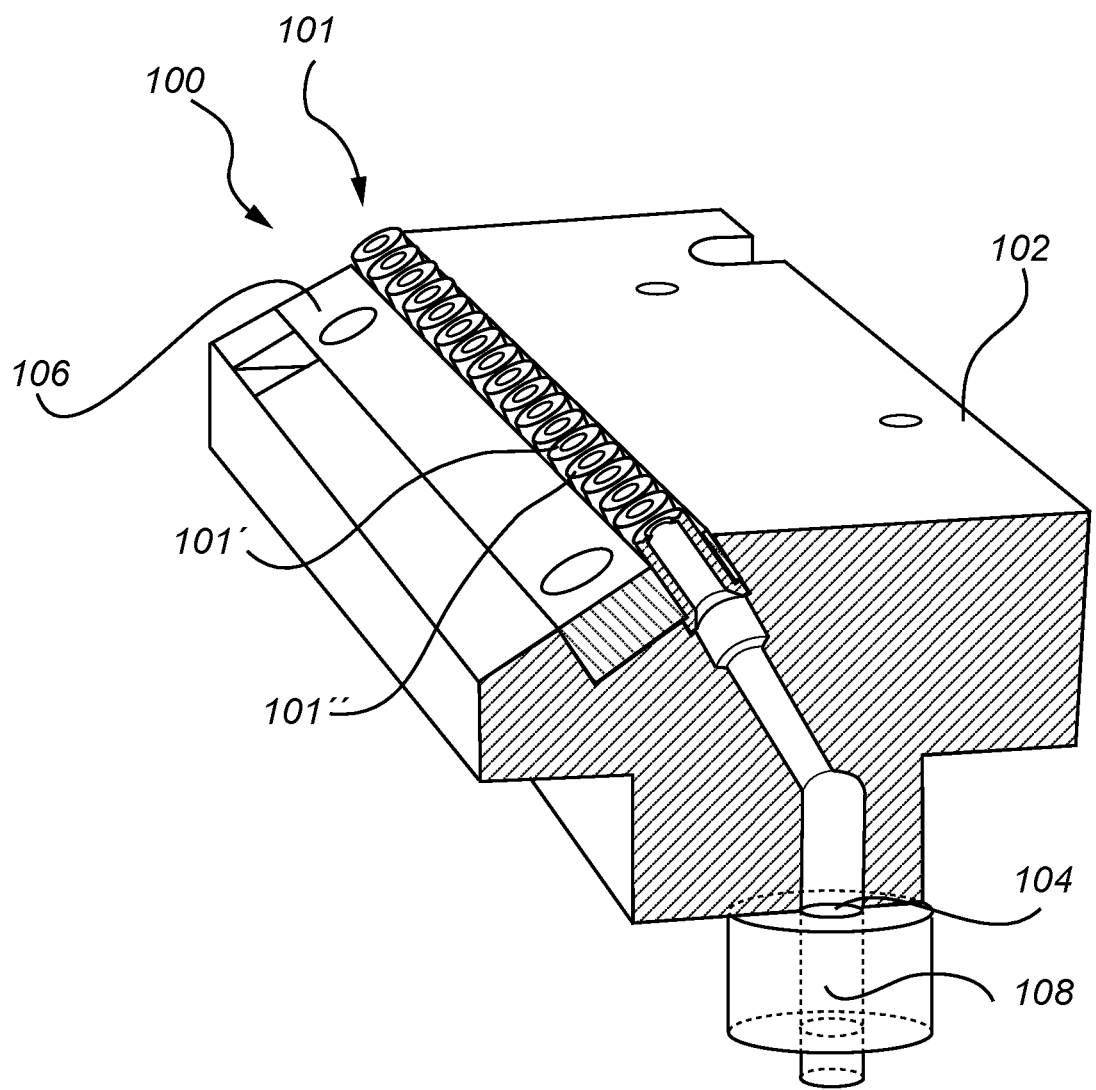
FIG. 3 is perspective view of a nozzle device according to at least one example embodiment of the inventive concept.

FIG. 3 illustrates a nozzle device 100 comprising a plurality of nozzles 101 for sorting objects using a gaseous or liquid media in accordance with at least one example embodiment of the present inventive concept. The nozzle device 100 comprises a nozzle bar 102 comprising gas or liquid supply means 104. The nozzle device 100 further comprises a nozzle holder 106 for holding the plurality of nozzles 101, each nozzle 101 in the plurality of nozzles 101 being configured in accordance any of the nozzles 1, 1',1" described in relation to FIGS. 1*a*-1*c* and 2. As illustrated in FIG. 3, the plurality of nozzles 101 is arranged "bottom-up", i.e. each nozzle 101 in the plurality of nozzles 101 is arranged to eject the gaseous or liquid media in a direction having a component being opposite to the force of gravity (i.e. each nozzle 101 is arranged to direct the gaseous or liquid media partly upwards as compared to a horizontal arrangement of the nozzle device 100).

Each nozzle 101 in the plurality of nozzles 101 is arranged to receive the gaseous or liquid media from the gas or liquid supply means 104. The gas or liquid supply means 104 may e.g. comprise a plurality of conduits 104, as illustrated in FIG. 3, where each conduit 104 is in fluid communication with a respective nozzle 101.

The distance, or the pitch, between two neighbouring nozzles 101', 101" may be between 1 mm and 100 mm. The pitch is here defined as the distance between the centrelines of the two neighbouring nozzles 101', 101".

The nozzle device 100 may comprise a pressure level adjustment means 108 arranged to control the pressure of the gaseous or liquid media supplied to the plurality of nozzles 101. For example, the pressure level adjustment means 108 may be arranged to increase and/or decrease the pressure level of the supplied gaseous or liquid media. The pressure level adjustment means 108 may e.g. comprise a valve 108.

Figure 4:
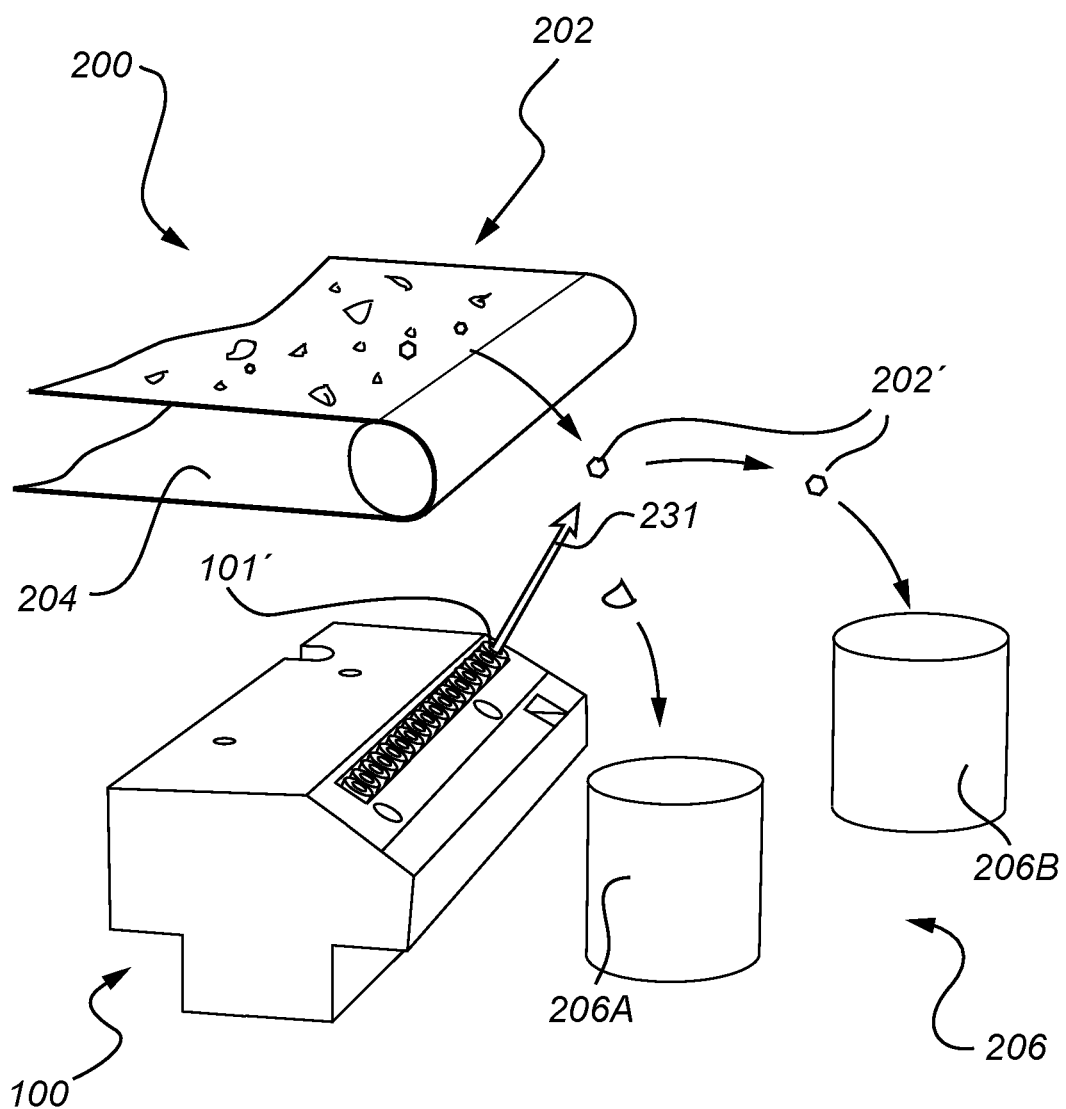
FIG. 4 is a schematic illustration of a system according to at least one example embodiment of the inventive concept.

FIG. 4 illustrates a system 200 comprising a nozzle device 100 as described with relation to FIG. 3, for sorting objects 202 using a gaseous or liquid media 231. The system 200 in FIG. 4 comprises transportation means 204 in the form of a conveyer belt 204 for transporting a material flow with objects 202 to be sorted. The system 200 further comprises receiving means 206, in the form of two containers 206A, 206B, for receiving the sorted objects 202'. The system 200 may also comprise a computing unit and receiver and transmitting units (not shown) in order to determine which objects 202 that is to be sorted out of the material flow. The computing unit then typically controls, possibly together with the pressure level adjustment means discussed in relation to FIG. 3, the flow of the gaseous or liquid media supplied to the nozzles in the nozzle device 100, based on the determination/identification of the objects 202.

In FIG. 4, the material flow of objects 202 is transported towards the nozzle device 100 by the conveyer belt 204, where after the objects 202 in the material flow are allowed to fall over the edge of the conveyer belt 204. During the descent of the falling objects 202, a certain nozzle 101' in the nozzle device 100 ejects the gaseous or liquid media towards the object 202' to be sorted whereby the falling path of the object 202' is changed compared to a falling path of an object which is not manipulated by the gaseous or liquid media. The sorted object 202' may thereby be forced and sorted into e.g. a container 206B as illustrated in FIG. 4.

The system 200 in FIG. 4 is designed such that some objects 202 in the material flow, e.g. objects of a certain size, are not causing the nozzle device 100 to eject a gaseous or liquid media. These objects may e.g. fall naturally from the conveyer belt 204 into the container 206A. The objects 202 not causing the nozzles device to eject a gaseous or liquid media may also be so large compared to the objects 202' to be sorted, that they are to a very low degree affected by the ejected gaseous or liquid media.

The objects 202' to be sorted may e.g. be identified/determined by the computing unit, the transmitting unit and the receiving unit described previously. Based on this identification/determination of the object 202' to be sorted, the appropriate nozzle 101' in the nozzle device 100 is activated and thereby allowed to eject the gaseous or liquid media 231 towards the object 202'.

Figure 5A:
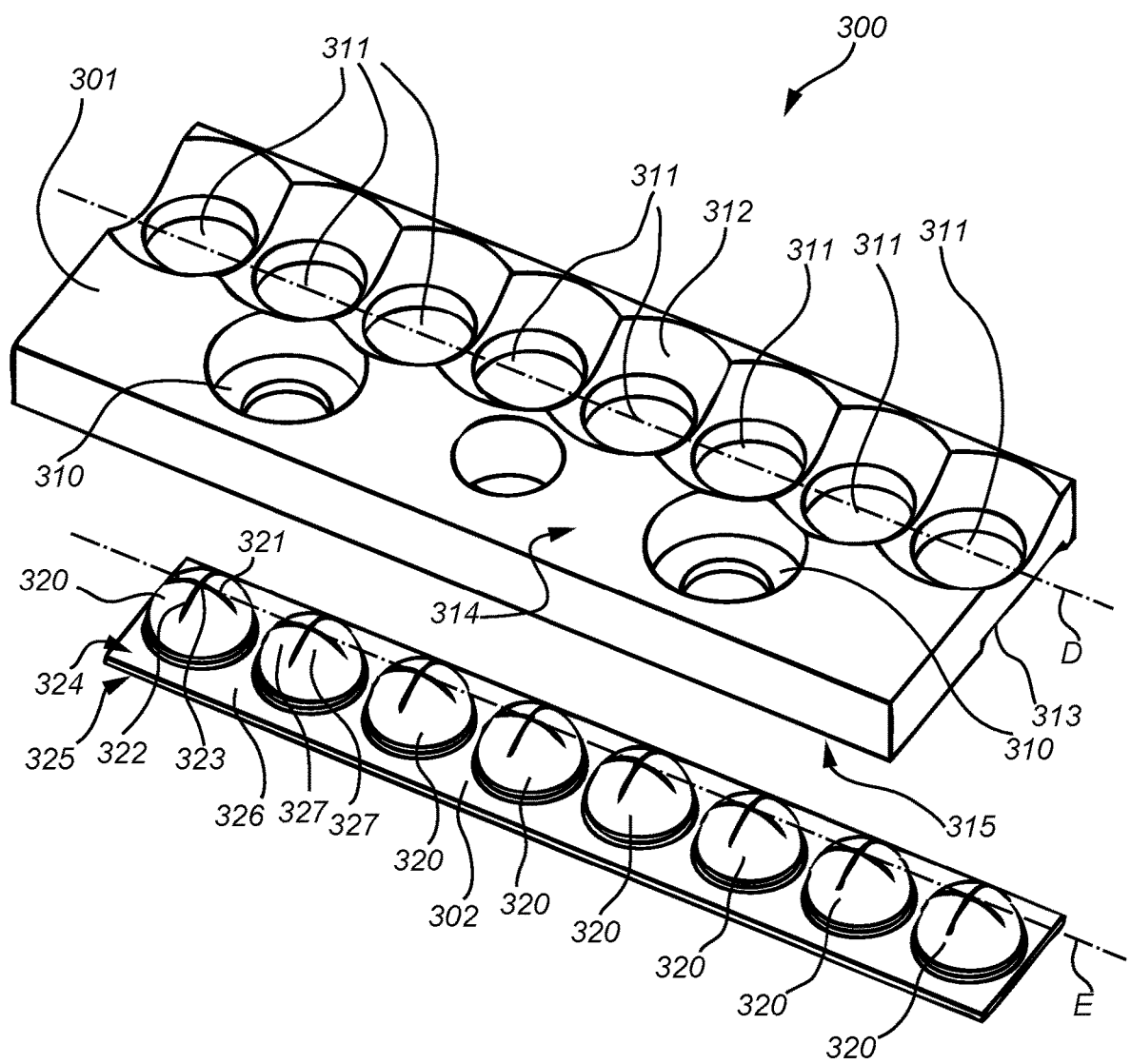
FIG. 5a is a perspective view of a nozzle fixation bar and a nozzle strip according to at least one example embodiment of the inventive concept.

FIG. 5a shows a perspective view of a nozzle assembly 300. The nozzle assembly 300 comprises a nozzle fixation bracket 301 and a nozzle unit 302. The nozzle fixation bracket is adapted for fixating, and/or holding, the nozzle unit 302 in place when the nozzle assembly 300 is arranged to work with a nozzle device 100 as shown in FIG. 4. The nozzle fixation bracket 301 is preferably made from a metal material. However, the nozzle fixation bracket 301 may be made in a high strength plastic material. The nozzle fixation bracket 301 has an upper surface 314 and a lower surface 315. The lower surface 315 is arranged to be facing the nozzle bar of a nozzle device (shown in FIG. 4) when the nozzle fixation bracket is holding a nozzle unit 302 in place. The upper surface 314 is arranged to be facing an object to be sorted when the nozzle fixation bracket 301 is holding a nozzle unit 302 in place.

The nozzle fixation bracket 301 is shown having eight through holes 311 each adapted for receiving a respective nozzle 320 when the nozzle bar 301 is in use with a nozzle device 100. The centre of each through hole 311 is aligned along a line D. The nozzle fixation bracket 301 and the nozzle unit 302 can be seen having a matching number of through holes 311 and nozzles 320. The nozzle unit is shown as a strip comprising a plurality of interconnected nozzles 320 and formed in one piece.

The nozzle fixation bracket 301 further comprises a rectangular box shaped channel 313 arranged to receive the nozzle unit 313. The channel 313 has a longitudinal extension parallel to the line D. The nozzle fixation bracket 301 further comprises two counterbore fixation holes 310 adapted for receiving a threaded bolt. Each respective bolt is arranged to thread into a threaded hole on a nozzle bar and its head is adapted to press the nozzle fixation bracket 301 against the nozzle bar (not shown). The counterbore fixation holes 310 may also be in the shape of countersunk holes (not shown).

The nozzle fixation plate 301 is arranged having eight semi-spherical recesses 312 each recess aligned with the centre of a respective through hole 311. The semi-spherical holes 311 together with each nozzle reduce the risk for debris and dirt to become lodge between the nozzle 320 and the semi-spherical hole 312 when the nozzles 320 are in use. Additionally when a nozzle deflects due to the gaseous media flowing through the nozzle 320 debris and dirt may be pushed away from the area between the nozzle 320 and the semi-spherical holes 311.

Each nozzle 320 has a dome or a half-spherical shape. Each nozzle 320 comprises a first and a second slit 321, 322. The first and second slits 321, 322 intersect in a centre point 323 of the nozzle dome 320. The first and second slits 321, 322 are arranged in the shape of a cross. However, the nozzle dome 320 may comprise more than two intersecting slits 321, 322 evenly arranged on the nozzle dome 320. For example two to four intersecting slits may be used and even up to 8 slits or more. Generally, a higher number of intersecting slits result in a lower and more even opening of the nozzle. However, at the same time a higher number may result in a higher wear of the material of the nozzle dome. The nozzle dome is preferably made in a plastic or polymer material, rubber, polyurethane, silicone, or other materials of similar elasticity.

The nozzle unit 302 comprises a base portion 326 having an upper and a lower surface 324, 325. When the nozzle unit 302 is fixated by the nozzle fixation bracket 301 the upper surface 324 of the nozzle unit 302 is in contact with the lower surface 315 of the channel 313 of the nozzle fixation bracket 301. The lower surface 325 of the nozzle unit 302 is in contact with the nozzle bar 102 of a nozzle device 100 shown in FIG. 4. Each nozzle dome 320 is arranged such that the intersecting centre point 323 of a nozzle dome 320 is aligned along a line E. When the nozzle unit 302 is fixated by the nozzle fixation bracket 301, line D and line E are parallel and coincide. The first and second slits 321, 322 divide a top portion of the nozzle dome 320 into four equally sized segments 327.

Figure 5B:
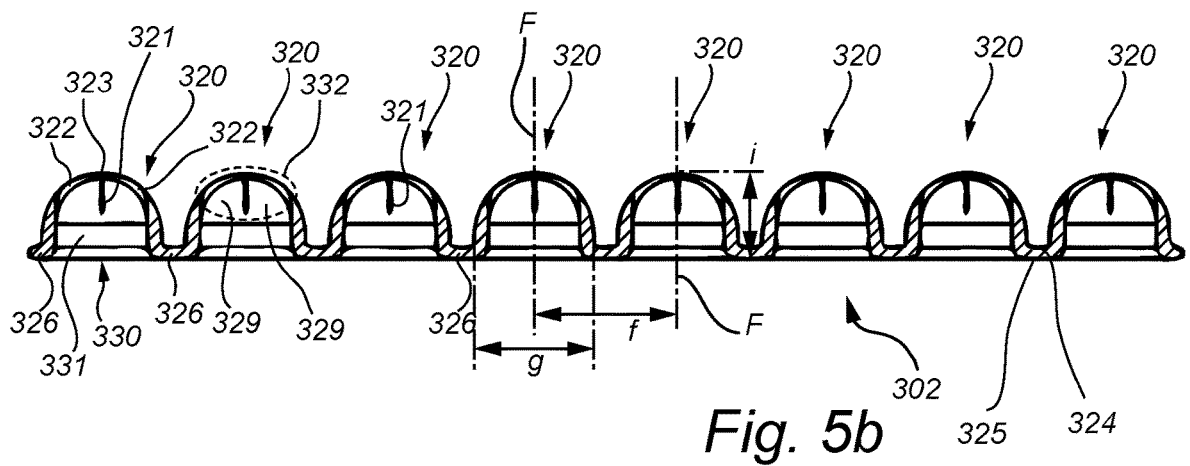
FIG. 5b illustrates a cross section of a nozzle strip according to at least one example embodiment of the inventive concept.

FIG. 5b illustrates a cross section of the nozzle unit 302 shown in FIG. 5a, taken along line E. The nozzle dome 320 may be seen as being half-spherical having a tapering, or narrowing thickness, towards the intersecting nozzle point 323 of the first and second slits 321, 322. When a gaseous media such as compressed air, presses on the inner surface 329 of the nozzle dome 320 the material of the nozzle dome 320 together with the segments 327 of the nozzle dome will deflect such that an opening between the slits 321, 322 widen thus releasing the gaseous media towards an object to be sorted. When no gaseous media is provided to the nozzle dome 320 the nozzle dome will return to its inactive state, e.g. the state shown in FIGS. 5a-5b. The centre to centre, C-C, distance f between two adjacent nozzle domes is 6.25 mm. The centre to centre distance f may also be between 5.5 mm and 6.5 mm. However, depending on the size of each nozzle dome 320 the distance f may be larger, such as between 8 mm and 20 mm or even larger than 20 mm. Each nozzle dome 320 has a base width, g, being in the range of 5 mm to 6 mm, measured at the upper surface 324 of the base portion 325. Each nozzle dome 320 base width g is shown as being approximately 5.2 mm. Naturally the base width g of a nozzle is chosen depending on the amount of, the pressure of gaseous media supplied to a nozzle dome 320 as well as the type and size of objects to be sorted. Hence, the nozzle dome 320 base width g may be larger than 6 mm and may also be smaller than 5 mm. The height i of a nozzle dome 320 is approximately 3.7 mm. However, the height i may be in the range of 3 mm to 15 mm, or even larger than 15 mm. The height i of a nozzle dome 320 further depend on the thickness of the nozzle fixation bracket 301. Hence, there is a relation between the thickness of the nozzle fixation bracket and the height i of a nozzle dome 320.

FIG. 5b further shows the inlet 330 of the nozzle as well as the outlet, and outlet portion 332 of the nozzle dome 320. Connecting the inlet 330 and the outlet, and outlet portion 332 is a channel 331.

Figure 6A:
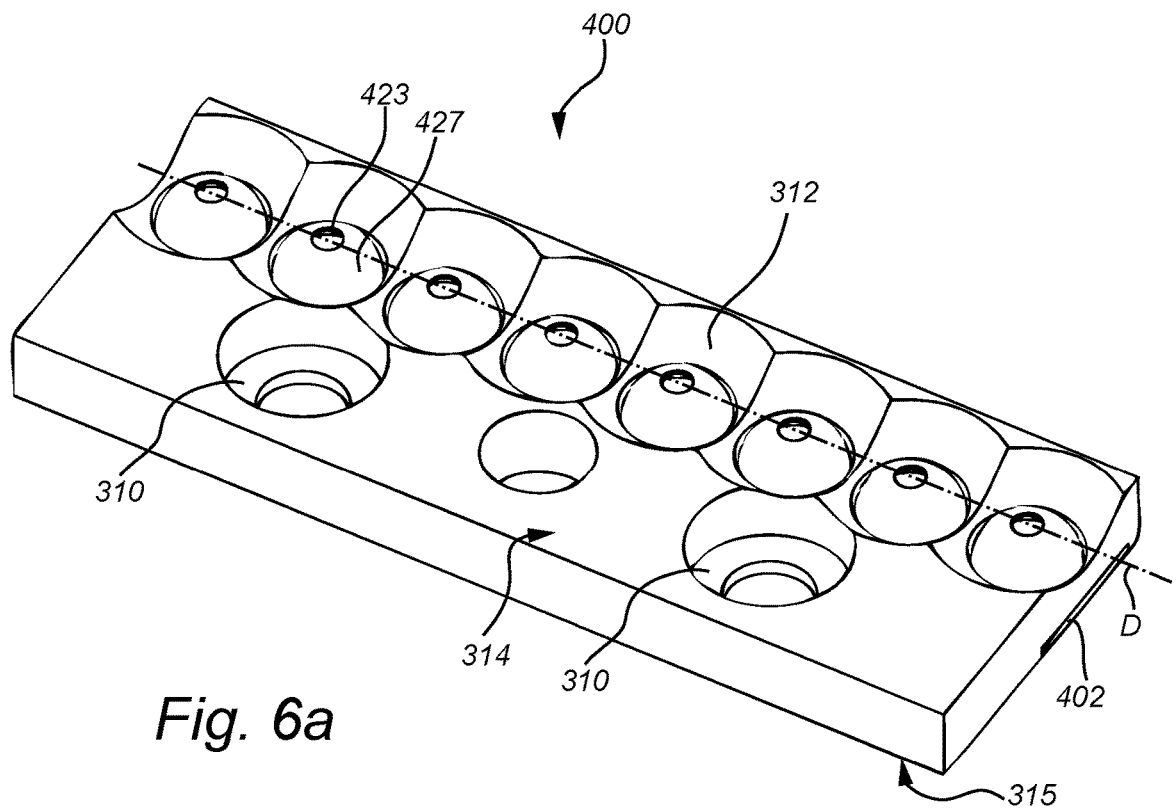
FIG. 6a is perspective view of a nozzle bar assembly according to at least one example embodiment of the inventive concept.

FIG. 6a shows a perspective view of a nozzle bar assembly 400 according to at least one example embodiment of the inventive concept. The nozzle fixation bracket 301 shown in FIG. 6a is the same as the nozzle fixation bracket 301 shown in FIG. 5a. However, the nozzle unit 302 shown in FIG. 5a has been replaced with a nozzle unit 402 of a different nozzle dome design.

Each nozzle dome 427 is arranged having a circular nozzle hole 423, or nozzle outlet 423. The nozzle hole 423 will be further discussed in FIG. 6b.

Figure 6B:
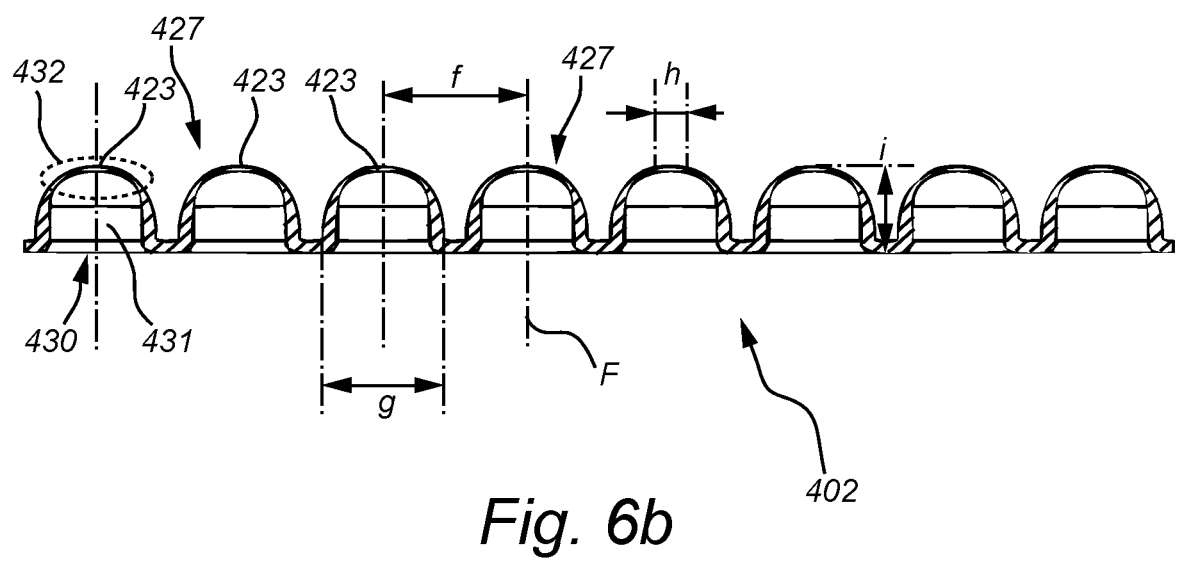
FIG. 6b illustrates a cross section of a nozzle assembly according to at least one example embodiment of the inventive concept.

FIG. 6b shows a cross section of the nozzle unit 402 shown in FIG. 6a along the line D. Each nozzle dome 427, shares the dome shape of the nozzle domes 327 shown in FIGS. 5a-5b however, instead of two slits each dome is arranged having a circular nozzle hole 423 in the outlet portion 432 of the nozzle dome 427. Each circular nozzle hole 423 is aligned with a centre axis of each nozzle dome 427. A difference between using slits as shown in FIGS. 5a-5b, and a circular nozzle hole 423 is that the circular nozzle holes 423 does not completely close when no gaseous media, such as compressed air, is provided to the inlet 430 of the nozzle 427. Connecting the outlet portion 432 and the inlet 430 of the nozzle 427 is a channel 431. Each circular nozzle hole has a diameter h being in the range of 1.5 mm. However, the diameter h may be configured to be larger, or smaller than 1.5 mm depending on the pressure of the gaseous media provided to the nozzle 427. If a large pressure of the gaseous media is provided the diameter h of the through hole 423 may be smaller than 1.5 mm, for instance between 0.5 mm to 1.5 mm. If the pressure of the gaseous media provided is small the diameter h of a through hole 423 may be larger than 1.5 mm, for instance between 1.5 mm and 3 mm.

While the nozzle, the nozzle device and the system are illustrated as having a particular configuration, one skilled on the art will recognize that such nozzle, nozzle device and/or system may include more or fewer components of different types. Indeed, one skilled in the art will recognize that the system illustrated in FIG. 4 have been constructed to illustrate an example set-up of a system such as e.g. a sorting machine in accordance with the present inventive concept, and therefore is presented by way of illustration and not by way of limitation. For example the present inventive concept is not limited to the specific system of transportation and receiving means as shown here, but any suitable type of transportation and receiving means are applicable Furthermore, the nozzle device illustrated in FIG. 3 may be designed in a various ways for example by comprising a larger or a smaller number of nozzles. In addition the dimensions of the nozzles disclosed in FIGS. 5a-6b may be altered depending on the pressure of gaseous media provided to the nozzle unit, as well as the type and size of objects to be sorted when said nozzles are arranged to a nozzle unit and used in a system for sorting objects.

ITEMIZED LIST OF EMBODIMENTS

Item 1. A nozzle for ejecting a gaseous or liquid media to sort objects, said nozzle comprising:
an inlet for receiving the gaseous or liquid media;
an outlet for ejecting the gaseous or liquid media towards an object to be sorted;
a channel extending between said inlet and said outlet;
a channel wall surrounding said channel,
an outlet portion surrounding at least said outlet;
wherein said outlet portion comprises a sub-portion protruding radially beyond said channel wall at least partly towards a centreline of said channel, said sub-portion comprising a flexible material in order for said sub-portion to deflect upon ejection of the gaseous or liquid media through said outlet.

Item 2. A nozzle according to item 1, wherein said sub-portion is arranged to protrude radially beyond said channel wall in such a way that a cross section of said outlet is smaller compared to a cross section of said channel.

Item 3. A nozzle according to any one of items 1-2, wherein said sub-portion is extending circumferentially around at least a part of said channel and/or said outlet.

Item 4. A nozzle according to any one of the preceding items, wherein said outlet portion comprises an outlet surface being parallel to said outlet, and a circumferentially arranged indentation extending from said outlet surface and at least partly towards said inlet.

Item 5. A nozzle according to item 4, wherein said indentation comprises an inner surface, and wherein at least a portion of said inner surface at least partly defines said sub-portion of said outlet portion.

Item 6. A nozzle according to any one of the preceding items, wherein the channel has a cross sectional area in the range of 0.15 mm$^2$-1300 mm$^2$ Item 7. A nozzle according to any one of the preceding items, wherein said outlet portion comprises a base portion from which said sub-portion protrudes, and wherein said base portion comprises a flexible material.

Item 8. A nozzle according to any one of the preceding items, wherein said channel wall comprises a flexible material.

Item 9. A nozzle according to any one of the preceding items, wherein said channel wall comprises a material being different from the material of said sub-portion.

Item 10. A nozzle according to any one of the preceding items, wherein said outlet portion is detachable from and/or attachable to said channel wall.

Item 11. A nozzle according to any one of the preceding items, wherein the flexible material comprises at least one of the following: rubber, polyurethane, silicone, or other materials of similar elasticity.

Item 12. A nozzle device for sorting objects using a gaseous or liquid media, said nozzle device comprising:
a nozzle bar comprising gas or liquid supply means, and
a nozzle holder for holding a plurality of nozzles, each nozzle in the plurality of nozzles being configured in accordance with any one of items 1-12, and each nozzle in the plurality of nozzles being arranged to receive a gaseous or liquid media from said gas or liquid supply means and being arranged to direct the gaseous or liquid media towards the object to be sorted.

Item 13. A nozzle device according to item 12, wherein a pitch between two neighbouring nozzles in the plurality of nozzles is between XX mm-XX mm.

Item 14. A nozzle device according to any one of items 12-13, comprising pressure level adjustment means arranged to control the pressure level of the gaseous or liquid media.

Item 15. A system for sorting objects using a gaseous or liquid media comprising:
transportation means for transporting a material flow with objects to be sorted,
receiving means for receiving the sorted objects,
a nozzle device according to any one of items 12-14.

The invention claimed is:

1. A nozzle device for sorting objects using a gaseous media, said nozzle device comprising:
a nozzle unit comprising at least two nozzles;
a gas supply for supplying the gaseous medium to the nozzle unit;
a nozzle bar connectable to the gas supply for providing the gaseous media to said nozzle unit; and
a nozzle fixation bracket adapted for holding said nozzle unit in place, wherein said nozzle fixation bracket comprises a number of through holes matching said number of nozzles, each through hole arranged for receiving a nozzle;
each one of said at least two nozzles comprising:
an inlet for receiving the gaseous media;
an outlet, having an outlet area, for ejecting the gaseous media towards an object to be sorted;
a channel wall extending between said inlet and said outlet defining a channel;
a hemispherical outlet portion surrounding at least said outlet, wherein said outlet portion comprises a flexible material; and
the hemispherical outlet portion further comprises a sub-portion that protrudes from the channel wall into the channel and which deflects outwardly upon ejection of the gaseous media, received from said nozzle bar, through said outlet whereby said outlet area increases, said sub-portion includes sections that are defined by at least a first slit and a second slit intersecting each other; and
wherein said nozzle unit is formed in one piece, and the at least two nozzles are interconnected by a strip, wherein both the strip and the at least two nozzles are formed of the same flexible material.

2. A device according to claim 1, wherein an outer surface of the nozzle fixation bracket comprises a chamfered or rounded recess arranged for each of the through holes and configured to allow deflection of said nozzle upon ejection of the gaseous media through said outlet.

3. A device according to claim 1, wherein said channel wall comprises a flexible material.

4. A device according to claim 1, wherein the flexible material comprises at least one of rubber, polyurethane, or silicone.

5. A device according to claim 1, wherein a centre to centre distance between two adjacent nozzles is between 4 mm-8 mm.

6. A device according to claim 1, comprising pressure level adjustment means arranged to control the pressure level of the gaseous media.

7. A device according to claim 1, wherein both the strip and the nozzle have the same elasticity.

8. A device according to claim 1, wherein when the gaseous material is ejected through the channel, the sub-portion deflects into a position that is more parallel with a flow of the ejected gaseous media.

9. A system for sorting objects using a gaseous media comprising:
transportation means for transporting a material flow with objects to be sorted,
receiving means for receiving the sorted objects,
a device according to claim 1.

10. A self cleaning nozzle device for sorting objects using a gaseous media, said self cleaning nozzle device comprising:
a nozzle unit comprising at least two self cleaning nozzles;
a gas supply for supplying the gaseous medium to the nozzle unit;
a nozzle bar connectable to the gas supply for providing the gaseous media to said nozzle unit; and
a nozzle fixation bracket adapted for holding said nozzle unit in place, wherein said nozzle fixation bracket comprises a number of through holes matching said number of nozzles, each through hole arranged for receiving a nozzle;
each one of said at least two self cleaning nozzles comprising:
an inlet for receiving the gaseous media;
an outlet, having an outlet area, for ejecting the gaseous media towards an object to be sorted;
a channel wall extending between said inlet and said outlet defining a channel;
a hemispherical outlet portion surrounding at least said outlet, wherein said outlet portion comprises a flexible material; and
the hemispherical outlet portion further comprises a sub-portion that protrudes from the channel wall into the channel and which deflects outwardly upon ejection of the gaseous media, received from said nozzle bar, through said outlet whereby said outlet area increases, said sub-portion includes sections that are defined by at least a first slit and a second slit intersecting each other; and
wherein said nozzle unit is formed in one piece, and the at least two nozzles are interconnected by a strip, wherein both the strip and the at least two nozzles are formed of the same flexible material.

11. A self cleaning nozzle device according to claim 10, wherein both the strip and the nozzle have the same elasticity.

12. A self cleaning nozzle device according to claim 10, wherein when the gaseous material is ejected through the channel, the sub-portion deflects into a position that is more parallel with a flow of the ejected gaseous media.

13. A nozzle device for sorting objects using a gaseous media, said nozzle device comprising:
- a nozzle unit comprising at least two nozzles;
- a gas supply for supplying the gaseous medium to the nozzle unit;
- a nozzle bar connectable to the gas supply for providing the gaseous media to said nozzle unit; and
- a nozzle fixation bracket adapted for holding said nozzle unit in place, wherein said nozzle fixation bracket comprises a number of through holes matching said number of nozzles, each through hole arranged for receiving a nozzle;

each one of said at least two nozzles comprising:
- an inlet for receiving the gaseous media;
- a hemispherical outlet, having an outlet area, for ejecting the gaseous media towards an object to be sorted;
- a channel wall extending between said inlet and said outlet defining a channel;
- an outlet portion surrounding at least said outlet, wherein said outlet portion comprises a flexible material; and
- the hemispherical outlet portion further comprises a sub-portion that protrudes from the channel wall into the channel and which deflects outwardly upon ejection of the gaseous media, received from said nozzle bar, through said outlet whereby said outlet area increases, said sub-portion includes sections that are defined by at least a first slit and a second slit intersecting each other.

* * * * *